United States Patent
Satou et al.

(10) Patent No.: US 8,053,041 B2
(45) Date of Patent: Nov. 8, 2011

(54) OVERCOAT FILM COMPOSITION, COLOR FILTER SUBSTRATE, AND LIQUID CRYSTAL DISPLAY ELEMENT

(75) Inventors: Hiroyuki Satou, Ichihara (JP); Takahiro Mori, Ichihara (JP)

(73) Assignee: JNC Corporation, Tokyo (JP)

( * ) Notice: Subject to any disclaimer, the term of this patent is extended or adjusted under 35 U.S.C. 154(b) by 1167 days.

(21) Appl. No.: 11/819,662

(22) Filed: Jun. 28, 2007

(65) Prior Publication Data

US 2008/0003381 A1    Jan. 3, 2008

(30) Foreign Application Priority Data

Jun. 29, 2006 (JP) .................................. 2006-179291
Mar. 28, 2007 (JP) .................................. 2007-084528

(51) Int. Cl.
*C08F 283/04* (2006.01)
*C08L 63/00* (2006.01)
*C09K 19/56* (2006.01)

(52) U.S. Cl. ................ 428/1.26; 428/1.25; 428/1.53; 428/1.54; 428/473.5; 428/474.4; 349/122; 349/106; 525/423; 525/432

(58) Field of Classification Search ............... 428/1.5, 428/473, 5, 474.4, 1.2, 1.25–1.26, 1.3–1.31, 428/1.33, 1.53–1.54, 473.5; 349/106, 122; 525/423, 432
See application file for complete search history.

(56) References Cited

U.S. PATENT DOCUMENTS

| | | | | |
|---|---|---|---|---|
| 3,981,847 A * | 9/1976 | Meyer et al. | | 528/351 |
| 4,101,488 A * | 7/1978 | Ishizuka et al. | | 524/592 |
| 4,208,464 A * | 6/1980 | Ishizuka et al. | | 428/377 |
| 4,347,306 A * | 8/1982 | Takeda et al. | | 427/97.5 |
| 5,554,684 A * | 9/1996 | Choi et al. | | 524/588 |
| 6,476,266 B1 * | 11/2002 | Mori et al. | | 564/330 |
| 2001/0031828 A1 * | 10/2001 | Honda et al. | | 525/107 |
| 2002/0093077 A1 * | 7/2002 | Jung et al. | | 257/642 |
| 2002/0145691 A1 * | 10/2002 | Ito | | 349/117 |

FOREIGN PATENT DOCUMENTS

| | | |
|---|---|---|
| JP | 09-291150 | 11/1997 |
| JP | 2001-158816 | 6/2001 |
| JP | 2005-105264 | 4/2005 |

OTHER PUBLICATIONS

JPO Website Machine English Translation of JP 2005-105264, Fukumura et al. Apr. 21, 2005.*

* cited by examiner

*Primary Examiner* — Sophie Hon
(74) *Attorney, Agent, or Firm* — Hogan Lovells US LLP

(57) ABSTRACT

There has been a need for an overcoat film composition that functions as an overcoat film in terms of high transparency and flatness, and that also functions as an aligning film in terms of liquid crystal molecular alignment. There has also been a need to lower the cost of manufacturing a liquid crystal display element. There is provided an overcoat film composition comprising one or more compounds selected from the group of polyester-polyamic acids (A1) obtained using at least a polyhydric hydroxy compound (a1), a diamine (a2), and a compound having two or more acid anhydride groups (a3), and polyester-polyimides (A2) that are imidization products thereof, and a polyamic acid (B).

6 Claims, No Drawings

OVERCOAT FILM COMPOSITION, COLOR FILTER SUBSTRATE, AND LIQUID CRYSTAL DISPLAY ELEMENT

CROSS REFERENCE TO RELATED APPLICATIONS

This application claims priority under 35 U.S.C. §119 to Japanese Patent Application Nos. JP 2006-179291 (filed Jun. 29, 2006) and JP 2007-084528 (filed Mar. 28, 2007) which applications are expressly incorporated herein by reference in their entirety.

BACKGROUND OF THE INVENTION

1. Field of the Invention

The invention relates to an overcoat film composition, and more particularly relates to an overcoat film composition used, for example, for flattening a color filter for a liquid crystal display element, to a color filter substrate that is formed using the composition, and to a liquid crystal display element having the color filter.

2. Related Art

Acrylic compositions, polyimide compositions, and so forth have been put to practical use as overcoat film compositions for flattening out color filters used with liquid crystal display elements. These compositions exhibit their function as an overcoat film when applied to a color filter and then dried and calcined (Japanese Laid-Open Patent Applications H09-291150, 2001-158816, and 2005-105264). Since these overcoat films are incapable of aligning liquid crystals, however, it is necessary to further coat the overcoat film with an aligning film composition, then dry and calcine this coating to form an aligning film, and then bring out its characteristics as an aligning film by subjecting it to a rubbing treatment.

Meanwhile, if an aligning film is formed by coating a color filter with an aligning film composition without first coating with an overcoat film composition, the unevenness of the color filter cannot be flattened out because the aligning film is usually a thin film only about 0.1 μm in thickness. It is impractical, however, to form an aligning film composition as a thick film of more than 1 μm in order to achieve a flattening function because there will be a sharp decrease in transmissivity.

SUMMARY OF THE INVENTION

There has been a need for an overcoat film composition that functions as an overcoat film in terms of high transparency and flatness, and that also functions as an aligning film in terms of liquid crystal molecular alignment. There has also been a need to lower the cost of manufacturing a liquid crystal display element.

It was discovered that a composition including one or more compounds selected from the group of polyester-polyamic acids (A1) and polyester-polyimides (A2) that are imidization products thereof, and a polyamic acid (B) has good transparency and flatness, and also has liquid crystal molecular alignment, and can be used as an overcoat film.

The invention provides the following overcoat film composition, etc.

[1] An overcoat film composition, including one or more compounds selected from the group of polyester-polyamic acids (A1) having structural units expressed by the following General Formulas (1) and (2):

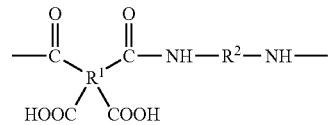

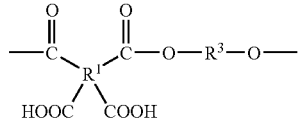

wherein $R^1$, $R^2$, and $R^3$ are each independently a $C_2$ to $C_{100}$ organic group;

and polyester-polyimides (A2) having structural units expressed by the following General Formulas (3) and (2):

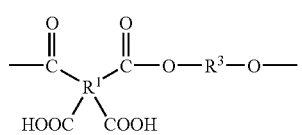

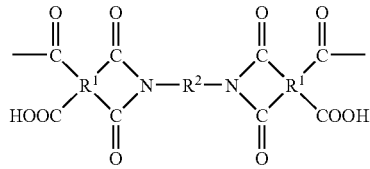

wherein $R^1$, $R^2$, and $R^3$ are each independently a $C_2$ to $C_{100}$ organic group;

and a polyamic acid (B).

[2] An overcoat film composition including a polyester-polyamic acid (A1) obtained using at least a polyhydric hydroxy compound (a1), a diamine (a2), and a compound having two or more acid anhydride groups (a3), and a polyamic acid (B).

[3] An overcoat film composition including one or more compounds selected from the group of polyester-polyamic acids (A1) obtained using at least a polyhydric hydroxy compound (a1), a diamine (a2), and a compound having two or more acid anhydride groups (a3), and polyester-polyimides (A2) that are imidization products thereof, and a polyamic acid (B).

[4] The overcoat film composition according to items [2] or [3], wherein the polyhydric hydroxy compound (a1) is a diol, and the compound having two or more acid anhydride groups (a3) is a tetracarboxylic dianhydride.

[5] The overcoat film composition according to items [2] or [3], wherein the polyhydric hydroxy compound (a1) is one or more compounds selected from the group of 1,4-butanediol, 1,5-pentanediol, and 1,6-hexanediol, the diamine (a2) is one or more compounds selected from the group of 3,3'-diaminodiphenylsulfone, bis[4-(3-aminophenoxy)phenyl]sulfone, and compounds expressed by the following Formula (b):

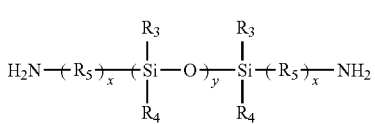

wherein $R_3$ and $R_4$ are each independently a $C_1$ to $C_3$ alkyl or phenyl, each $R_5$ is independently a methylene, phenylene, or alkyl-substituted phenylene, each x is independently an integer from approximately 1 to approximately 6, and y is an integer from approximately 1 to approximately 100;

and the compound having two or more acid anhydride groups (a3) is one or more compounds selected from the group of styrene/maleic anhydride copolymers, 3,3',4,4'-diphenyl ether tetracarboxylic dianhydride, 3,3',4,4'-diphenylsulfonetetracarboxylic dianhydride, and butanetetracarboxylic dianhydride.

[6] The overcoat film composition according to any of items [2] to [5], wherein the polyester-polyamic acid (A1) is obtained by reacting approximately 0.1 to approximately 10 mol of the amino groups of the diamine (a2) and approximately 1 to approximately 10 mol of an anhydride of the compound having two or more acid anhydride groups (a3) with approximately 1 mol of the hydroxy groups of the polyhydric hydroxy compound (a1).

[7] The overcoat film composition according to items [2] to [6], wherein the polyester-polyamic acid (A1) has structural units expressed by the following General Formulas (1) and (2):

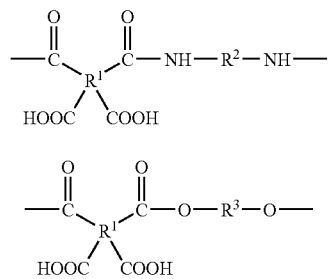

wherein $R^1$, $R^2$, and $R^3$ are each independently a $C_2$ to $C_{100}$ organic group.

[8] The overcoat film composition according to any of items [2] to [7], wherein the polyester-polyimide (A2) has structural units expressed by the following General Formulas (3) and (2):

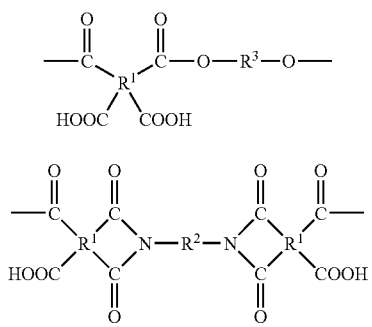

wherein $R^1$, $R^2$, and $R^3$ are each independently a $C_2$ to $C_{100}$ organic group.

[9] An overcoat film composition, including one or more compounds selected from the group of polyester-polyamic acids (A1) having structural units expressed by the following General Formulas (1) and (2):

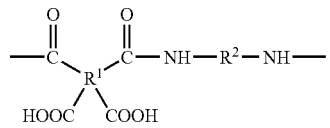

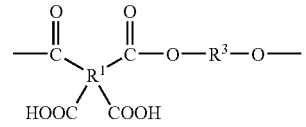

wherein $R^1$, $R^2$, and $R^3$ are each independently a $C_2$ to $C_{100}$ organic group, and polyester-polyimides (A2) having structural units expressed by the following General Formulas (3) and (2):

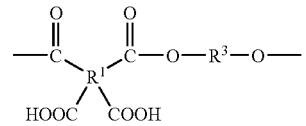

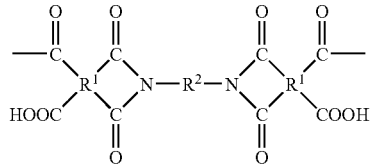

wherein $R^1$, $R^2$, and $R^3$ are each independently a $C_2$ to $C_{100}$ organic group), and a polyamic acid (B).

[10] The overcoat film composition according to any of items [1] to [9], wherein the polyamic acid (B) is obtained using one or more diamines selected from the group of 4,4'-diaminodiphenyl ether, 4,4'-diaminodiphenylmethane, 3,3'-diaminodiphenylmethane, 3,3'-dimethyl-4,4'-diaminodiphenylmethane, 2,2-bis[4-(4-aminophenoxy)phenyl]propane, 2,2-bis[4-(4-aminophenoxy)phenyl]hexafluoropropane, m-phenylenediamine, p-phenylenediamine, m-xylylenediamine, p-xylylenediamine, 2,2'-diaminodiphenylpropane, benzidine, 1,1-bis[4-(4-aminophenoxy)phenyl]cyclohexane, 1,1-bis[4-(4-aminophenoxy)phenyl]-4-methylcyclohexane, bis[4-(4-aminobenzyl)phenyl]methane, 1,1-bis[4-(4-aminobenzyl)phenyl]cyclohexane, 1,1-bis[4-(4-aminobenzyl)phenyl]-4-methylcyclohexane, and 1,1-bis[4-(4-aminobenzyl)phenyl]methane, and one or more tetracarboxylic dianhydrides selected from the group consisting of pyromellitic dianhydride, 1,2,3,4-cyclobutanetetracarboxylic dianhydride, 1,2,3,4-butanetetracarboxylic dianhydride, 1,2,4,5-cyclohexanetetracarboxylic dianhydride, 3,3',4,4'-diphenyl ether tetracarboxylic dianhydride, and 3,3',4,4'-diphenylsulfonetetracarboxylic dianhydride.

[11] The overcoat film composition according to any of items [1] to [10], wherein the polyester-polyamic acid (A1) is contained in an amount of approximately 2 to approximately 40 wt %, and the polyamic acid (B) approximately 0.1 to approximately 20 wt %.

[12] The overcoat film composition according to any of items [1] to [11], wherein the overcoat film composition further includes an epoxy resin (C).

[13] The overcoat film composition according to item [12], wherein the epoxy resin (C) is one or more compounds selected from the group of compounds expressed by the following formulas:

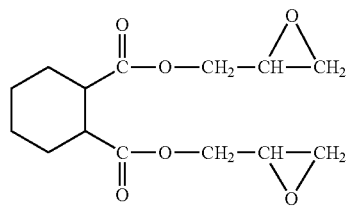
(220)

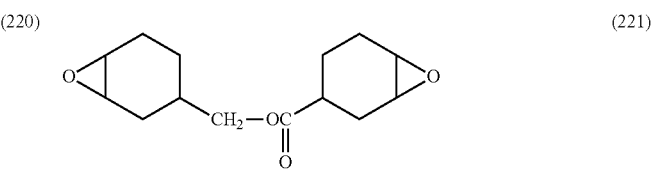
(221)

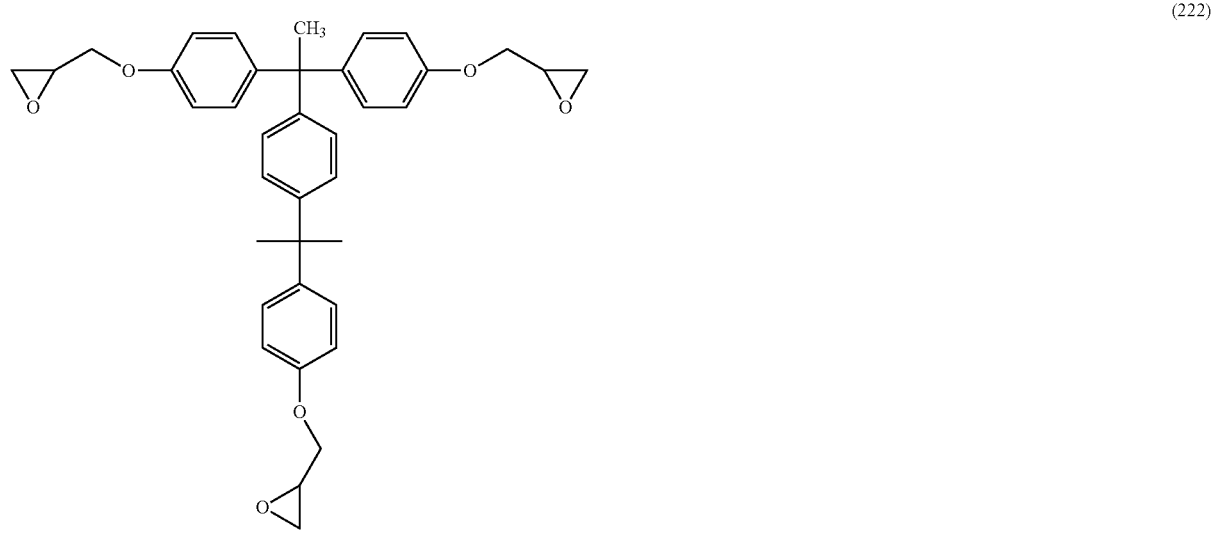
(222)

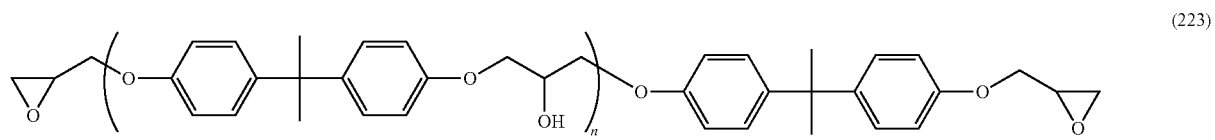
(223)

wherein n is an integer from approximately 0 to approximately 10.

[14] The overcoat film composition according to items [12] or [13], wherein the polyester-polyamic acid (A1) is contained in an amount of approximately 2 to approximately 40 wt %, the polyamic acid (B) approximately 0.1 to approximately 20 wt %, and the epoxy resin (C) approximately 0.5 to approximately 20 wt %.

[15] An overcoat film composition, including approximately 5 to approximately 30 wt % a polyester-polyamic acid (A1) obtained by reacting 1,4-butanediol, 3,3'-diamino diphenylsulfone, and 3,3',4,4'-diphenyl ether tetracarboxylic dianhydride, approximately 0.2 to approximately 10 wt % a polyamic acid (B) obtained by reacting 4,4'-diaminodiphenyl ether, pyromellitic dianhydride, and 1,2,3,4-cyclobutanetetracarboxylic dianhydride, and one or more epoxy resins (C) selected from the group of compounds expressed by the following Formulas (220) to (223):

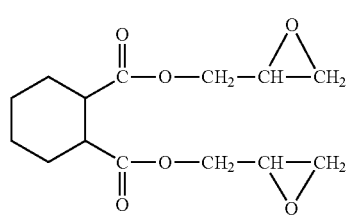
(220)

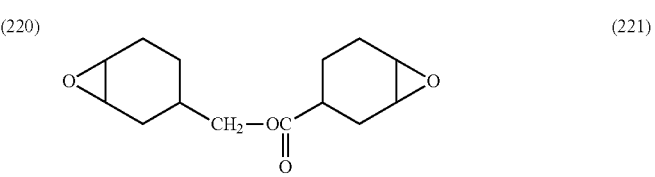
(221)

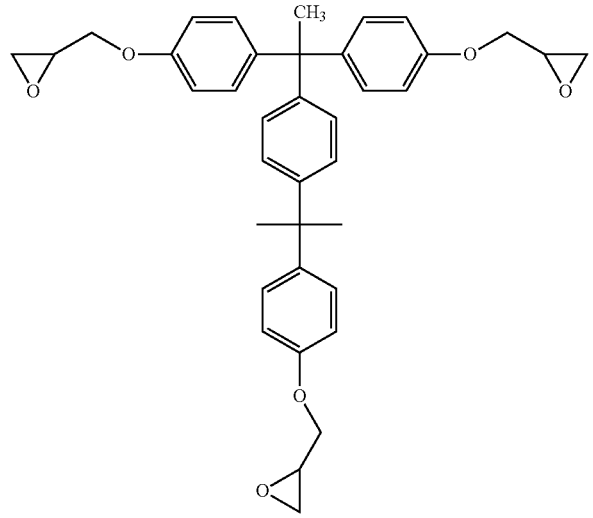

(222)

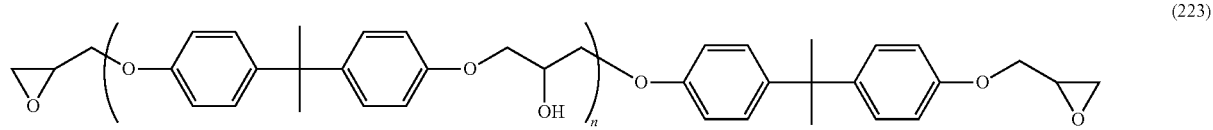

(223)

wherein n is an integer from approximately 0 to approximately 10.

[16] An overcoat film, obtained from the overcoat film composition according to any of items [1] to [15].

[17] A display element substrate, including the overcoat film according to item [16] and an optical film obtained from a polymerizable liquid crystal composition formed on the overcoat film.

[18] A color filter substrate, on which the overcoat film according to item [16] is formed.

[19] A liquid crystal display element, having the display element substrate according to item [17] or the color filter substrate according to [18].

There are no particular restrictions on the "substrate" used in the invention, as long as it is an object which is coated with the overcoat film composition etc., of the invention. The form of the substrate includes not only plate-shape but also curved-shape. The substrate may or may not be flexible.

The overcoat film composition pertaining to a preferred embodiment of the invention, and an overcoat film composed of the composition, have, for example, high transparency, and have good liquid crystal molecular alignment when subjected to a rubbing treatment. Also, there is no need to form an aligning film with a color filter substrate on which is formed an overcoat film composed of the overcoat film composition pertaining to a preferred embodiment of the invention. This aspect of the invention simplifies the process of manufacturing the liquid crystal display element of the invention, and affords a reduction in the manufacturing cost thereof.

DESCRIPTION OF THE PREFERRED EMBODIMENTS

The invention provides an overcoat film composition including a polyester-polyamic acid (A1) and a polyamic acid (B).

The invention also provides an overcoat film composition including one or more compounds selected from the group of polyester-polyamic acids (A1) and polyester-polyimides (A2) that are imidization products thereof, and a polyamic acid (B).

1 Polyester-Polyamic Acid (A1)

The polyester-polyamic acid (A1) is a compound having structural units expressed by General Formulas (1) and (2). The terminals of the polyester-polyamic acid (A1) are constituted, for example, by an acid anhydride group, amino, hydroxy, or the like.

There are no particular restrictions on $R^1$, $R^2$, and $R^3$ in Formulas (1) and (2) as long as each is a $C_2$ to $C_{100}$ organic group.

In general, the higher the molecular weight of the polyester-polyamic acid (A1), the better the chemical resistance of the film obtained from the overcoat film composition of the invention, and the lower the molecular weight of the polyester-polyamic acid (A1), the better the solubility in solvents. In view of this, the weight average molecular weight of the polyester-polyamic acid (A1) contained in the overcoat film composition of the invention is preferably approximately 1,000 to approximately 200,000, and more preferably approximately 2,000 to approximately 150,000.

There are no particular restrictions on the concentration of the polyester-polyamic acid (A1) in the overcoat film composition of the invention, but approximately 2 to approximately 40 wt % is preferable, and approximately 5 to approximately 30 wt % is more preferable. These concentration ranges are preferable because the viscosity of the overcoat film composition will be ideal and a coating film of uniform thickness can be formed by a variety of coating methods.

The polyester-polyamic acid (A1) used in the invention is obtained, for example, from a polyhydric hydroxy compound (a1), a diamine (a2), and a compound having two or more acid anhydride groups (a3), but the invention is not limited to this method.

In the polyester-polyamic acid (A1) obtained in this way, $R^1$ in the above-mentioned Formulas (1) and (2) is a residue of the compound having two or more acid anhydride groups (a3), $R^2$ in Formula (1) is a residue of the diamine (a2), and $R^3$ in Formula (2) is a residue of the polyhydric hydroxy compound (a1).

The polyhydric hydroxy compounds (a1), diamines (a2), and compounds having two or more acid anhydride groups (a3) that can be used to obtain the polyester-polyamic acid (A1) will now be described.

1.1 Polyhydric Hydroxy Compound (a1)

Specific examples of the polyhydric hydroxy compound (a1) used in the synthesis of the polyester-polyamic acid (A1) in the invention include ethylene glycol, diethylene glycol, triethylene glycol, tetraethylene glycol, polyethylene glycol with a molecular weight of approximately 1000 or less, propylene glycol, dipropylene glycol, tripropylene glycol, tetrapropylene glycol, polypropylene glycol with a molecular weight of approximately 1000 or less, 1,2-butanediol, 1,3-butanediol, 1,4-butanediol, 1,2-pentanediol, 1,5-pentanediol, 2,4-pentanediol, 1,2,5-pentanetriol, 1,2-hexanediol, 1,6-hexanediol, 2,5-hexanediol, 1,2,6-hexanetriol, 1,2-heptanediol, 1,7-heptanediol, 1,2,7-heptanetriol, 1,2-octanediol, 1,8-octanediol, 3,6-octanediol, 1,2,8-octanetriol, 1,2-nonanediol, 1,9-nonanediol, 1,2,9-nonanetriol, 1,2-decanediol, 1,10-decanediol, 1,2,10-decanetriol, 1,2-dodecanediol, 1,12-dodecanediol, glycerin, trimethylolpropane, pentaerythritol, dipentaerythritol, Bisphenol A™, Bisphenol S™, Bisphenol F™, diethanolamine, triethanolamine, SEO-2™ (Nikka Chemical), SKY CHDM™ (New Japan Chemical), Rikabinol HB™ (New Japan Chemical), and compounds expressed by the following Formula (A).

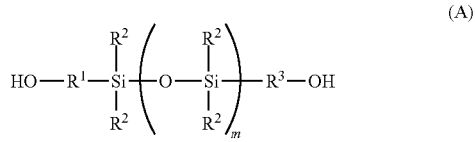

(A)

In Formula (A), $R^1$ and $R^3$ are each independently —$(CH_2)_x$—O—$(CH_2)_y$—, x and y are each dependently an integer from approximately 1 to approximately 15, $R^2$ is a $C_1$ to $C_5$ alkyl, and m is an integer from approximately 2 to approximately 50.

From the standpoint of increasing the transparency of the resulting overcoat film composition, for example, of the specific examples of the polyhydric hydroxy compound (a1) given above, ethylene glycol, propylene glycol, 1,4-butanediol, 1,5-pentanediol, 1,6-hexanediol, 1,7-heptanediol, 1,8-octanediol, and SKY CHDM™ (New Japan Chemical) are preferable, and of these, 1,4-butanediol, 1,5-pentanediol, and 1,6-hexanediol are especially favorable.

1.2 Diamine (a2)

Specific examples of the diamine (a2) used in the synthesis of the polyester-polyamic acid (A1) in the invention include 4,4'-diaminodiphenylsulfone, 3,3'-diaminodiphenylsulfone, 3,4'-diaminodiphenylsulfone, bis[4-(4-aminophenoxy)phenyl]sulfone, bis[4-(3-aminophenoxy)phenyl]sulfone, bis[3-(4-aminophenoxy)phenyl]sulfone, [4-(4-aminophenoxy)phenyl][3-(4-aminophenoxy)phenyl]sulfone, [4-(3-aminophenoxy)phenyl][3-(4-aminophenoxy)phenyl] sulfone, 2,2-bis[4-(4-aminophenoxy)phenyl] hexafluoropropane, and compounds expressed by the following Formula (b).

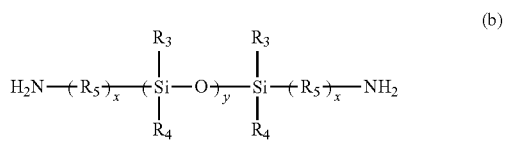

(b)

In Formula (b), $R_3$ and $R_4$ are each independently a $C_1$ to $C_3$ alkyl or phenyl, each $R_5$ is independently a methylene, phenylene, or alkyl-substituted phenylene, each x is independently an integer from approximately 1 to approximately 6, and y is an integer from approximately 1 to approximately 100.

From the standpoint of increasing the transparency of the resulting overcoat film, for example, of the specific examples of the diamine (a2) given above, 3,3'-diaminodiphenylsulfone, bis[4-(3-aminophenoxy)phenyl]sulfone, and compounds expressed by the above-mentioned Formula (b) are preferable, and of these, 3,3'-diaminodiphenylsulfone is especially favorable.

In this Specification, the "alkyl" in the "alkyl-substituted phenylene" is preferably a $C_2$ to $C_{10}$ alkyl, and more preferably a $C_2$ to $C_6$ alkyl. Examples of alkyls, although not limited to these, include ethyl, propyl, isopropyl, butyl, s-butyl, t-butyl, pentyl, hexyl, and dodecanyl.

1.3 Compound Having Two or More Acid Anhydride Groups (a3)

Specific examples of the compound having two or more acid anhydride groups (a3) used in the synthesis of the polyester-polyamic acid (A1) in the invention include copolymers of a radical polymerizable monomer having an anhydride group and another radical polymerizable monomer, such as styrene/maleic anhydride copolymers and methyl methacrylate/maleic anhydride copolymers; aromatic tetracarboxylic dianhydrides, such as dianhydrides 3,3',4,4'-benzophenone tetracarboxylic dianhydride, 2,2',3,3'-benzophenone tetracarboxylic dianhydride, 2,3,3',4'-benzophenone tetracarboxylic dianhydride, 3,3',4,4'-diphenylsulfone tetracarboxylic dianhydride, 2,2',3,3'-diphenylsulfone tetracarboxylic dianhydride, 2,3,3',4,'-diphenylsulfone tetracarboxylic dianhydride, 3,3',4,4'-diphenyl ether tetracarboxylic dianhydride, 2,2',3,3'-diphenyl ether tetracarboxylic dianhydride, 2,3,3',4'-diphenyl ether tetracarboxylic dianhydride, 2,2-[bis(3,4-dicarboxyphenyl)]hexafluoropropane dianhydride, and ethylene glycol bis(anhydrotrimellitate) (TMEG-100™, New Japan Chemical); alicyclic tetracarboxylic dianhydrides, such as cyclobutane tetracarboxylic dianhydride, methylcyclobutanetetracarboxylic dianhydride, cyclopentanetetra carboxylic dianhydride, and cyclohexanetetracarboxylic dianhydride; and aliphatic tetracarboxylic dianhydrides such as ethanetetracarboxylic dianhydride and butanetetracarboxylic dianhydride.

From the standpoint of increasing the transparency of the resulting overcoat film, for example, of the specific examples of the compound having two or more acid anhydride groups (a3) given above, it is preferable to use one that will give a resin with good transparency, such as a styrene/maleic anhydride copolymer, 3,3',4,4'-diphenylsulfone tetracarboxylic dianhydride, 3,3',4,4'-diphenyl ether tetracarboxylic dianhydride, 2,2-[bis(3,4-dicarboxyphenyl)]hexafluoropropane dianhydride, ethylene glycol bis(anhydrotrimellitate) (TMEG-100™, New Japan Chemical), cyclobutanetetracarboxylic dianhydride, and butanetetracarboxylic dianhydride, and of these, styrene/maleic anhydride copolymers, 3,3',4,4'-diphenyl ether tetracarboxylic dianhydride, 3,3',4,4'-diphenylsulfone tetracarboxylic dianhydride, and butanetetracarboxylic dianhydride are especially favorable.

1.4 Additives Added to the Polyester-Polyamic Acid (A1)

If the polyester-polyamic acid (A1) used in the invention has an acid anhydride group at its molecular terminal, a monohydric alcohol can be added and reacted if necessary. A polyester-polyamic acid (A1) to which a monohydric alcohol has been added is preferable because it will have better flatness, for example.

Examples of monohydric alcohols that can be added include methanol, ethanol, 1-propanol, isopropyl alcohol, allyl alcohol, benzyl alcohol, hydroxyethyl methacrylate, propylene glycol monoethyl ether, propylene glycol monomethyl ether, dipropylene glycol monoethyl ether, dipropylene glycol monomethyl ether, ethylene glycol monoethyl ether, ethylene glycol monomethyl ether, diethylene glycol monoethyl ether, phenol, borneol, maltol, linalol, terpineol, dimethylbenzylcarbinol, ethyl lactate, glycidol, and 3-ethyl-3-hydroxymethyloxetane.

From the standpoint of increasing the flatness of the resulting overcoat film, for example, of the specific examples of monohydric alcohols given above, isopropyl alcohol, allyl alcohol, benzyl alcohol, hydroxyethyl methacrylate, propylene glycol monoethyl ether, and 3-ethyl-3-hydroxymethyloxyetane are preferable, and of these, benzyl alcohol is especially favorable.

Also, 3-aminopropyltrimethoxysilane, 3-aminopropyltriethoxysilane, 3-aminopropylmethyldimethoxysilane, 3-aminopropylmethyldiethoxysilane, 4-aminobutyltrimethoxysilane, 4-aminobutyltriethoxysilane, 4-aminobutylmethyldimethoxysilane, p-aminophenyltrimethoxysilane, p-aminophenyltriethoxysilane, p-aminophenylmethyldimethoxysilane, p-aminophenylmethyldiethoxysilane, m-aminophenyltrimethoxysilane, m-aminophenylmethyldiethoxysilane, or another such silicon-containing monoamine is preferably reacted with a polyester-polyamic acid (A1) having an acid anhydride group at its molecular terminal, because this will improve the chemical resistance of the coating film that is obtained, for example.

A monohydric alcohol and a silicon-containing monoamine can also be simultaneously added to and reacted with the polyester-polyamic acid (A1).

1.5 Reaction Conditions

The polyester-polyamic acid (A1) is preferably obtained by reacting approximately 0.1 to approximately 10 mol of the amino groups of the diamine (a2) and approximately 1 to approximately 10 mol of an anhydride of the compound having two or more acid anhydride groups (a3) with approximately 1 mol of the hydroxy groups of the polyhydric hydroxy compound (a1). Even more preferably, the polyester-polyamic acid (A1) is obtained by reacting approximately 0.2 to approximately 5 mol of the amino groups of the diamine (a2) and approximately 1.1 to approximately 5 mol of an anhydride of the compound having two or more acid anhydride groups (a3) with approximately 1 mol of the hydroxy groups of the polyhydric hydroxy compound (a1).

There are no particular restrictions on the solvent used to obtain the polyester-polyamic acid (A1), as long as it allows this compound to be synthesized, but examples include diethylene glycol dimethyl ether, diethylene glycol diethyl ether, diethylene glycol methylethyl ether, diethylene glycol monoethyl ether acetate, ethylene glycol monoethyl ether acetate, propylene glycol monomethyl ether acetate, methyl 3-methoxypropionate, ethyl 3-ethoxypropionate, cyclohexanone, N-methyl-2-pyrrolidone, and N,N-dimethylacetamide. Of these, the use of propylene glycol monomethyl ether acetate, methyl 3-methoxypropionate, diethylene glycol methyl ether, and N-methyl-2-pyrrolidone is preferred.

These solvents can be used alone or as a mixture of two or more kinds of solvent. Solvents other than those listed above can also be admixed, but these other solvents preferably are not used for more than approximately 30 wt %.

It is preferable for the solvent to be used in an amount of at least approximately 100 weight parts per combined approximately 100 weight parts of the polyhydric hydroxy compound (a1), the diamine (a2), and the compound having two or more acid anhydride groups (a3), because the reaction will proceed more smoothly. The reaction is preferably conducted at approximately 40° C. to approximately 200° C. for approximately 0.2 to approximately 20 hours.

If a silicon-containing monoamine is added to and reacted with the polyester-polyamic acid (A1), it is preferable to add the silicon-containing monoamine after the reaction between the polyhydric hydroxy compound (a1), the diamine (a2), and the compound having two or more acid anhydride groups (a3) has concluded, and after the reaction solution has cooled to approximately 40° C. or lower, and for the reaction to be conducted at approximately 10° C. to approximately 40° C. for approximately 0.1 to approximately 6 hours. Furthermore, monohydric alcohol can also be added to and reacted with the polyester-polyamic acid (A1).

There are no particular restrictions on the order in which the raw materials are added to the reaction system. Specifically, the polyhydric hydroxy compound (a1), the diamine (a2), and the compound having two or more acid anhydride groups (a3) can all be added at the same time to the solvent; the diamine (a2) and the polyhydric hydroxy compound (a1) can be dissolved in the reaction solvent, after which the compound having two or more acid anhydride groups (a3) is added; the polyhydric hydroxy compound (a1) and the compound having two or more acid anhydride groups (a3) can be reacted ahead of time to synthesize a copolymer, after which the diamine (a2) is added; the diamine (a2) and the compound having two or more acid anhydride groups (a3) can be reacted ahead of time to synthesize a copolymer, after which the polyhydric hydroxy compound (a1) is added; and so on.

1.6 Polyester-Polyimide (A2)

The polyester-polyimide (A2) is a compound having structural units expressed by General Formulas (3) and (2). An acid anhydride group, amino, hydroxy, or the like is at a terminal of the polyester-polyimide (A2). $R^1$, $R^2$ and $R^3$ in Formulas (3) and (2) are defined as above.

In general, the higher the molecular weight of the polyester-polyimide (A2), the better the chemical resistance of the film obtained from the overcoat film composition of the invention, and the lower the molecular weight of the polyester-polyimide (A2), the better the solubility in solvents. In view of this, the weight average molecular weight of the polyester-polyimide (A2) contained in the overcoat film composition of the invention is preferably approximately 1,000 to approximately 200,000, and more preferably approximately 2,000 to approximately 150,000.

There are no particular restrictions on the concentration of the polyester-polyimide (A2) in the overcoat film composition of the invention, but approximately 2 to approximately 40 wt % is preferable, and approximately 5 to approximately 30 wt % is more preferable. These concentration ranges are preferable because the viscosity of the overcoat film composition will be ideal and coating film of uniform thickness can be formed by a variety of coating methods.

The polyester-polyimide (A2) used in the invention is obtained, for example, by imitating the polyester-polyamic acid (A1). In the polyester-polyimide (A2) obtained in this way, $R^1$ in the above-mentioned Formulas (2) and (3) is a residue of the compound having two or more acid anhydride groups (a3), $R^2$ in Formula (3) is a residue of the diamine (a2), and $R^3$ in Formula (2) is a residue of the polyhydric hydroxy compound (a1).

2 Polyamic Acid (B)

There are no particular restrictions on the polyamic acid (B) used in the invention, as long as it has such a functional group. Also, the overcoat film composition may include not only a single polyamic acid, but also a plurality of polyamic acids.

There are no particular restrictions on the concentration of the polyamic acid (B) in the overcoat film composition in the invention, but approximately 0.1 to approximately 20 wt % is preferable, and approximately 0.2 to approximately 10 wt % is more preferable. These concentration ranges are preferable because the liquid crystal molecular alignment and transparency of the overcoat film will be higher.

With the invention, the polyamic acid may be added after first being converted into a polyimide that has been partially or completely imitated by heating or dehydration treatment.

The polyamic acid (B) is obtained, for example, by reacting a diamine and a compound having an acid anhydride group.

2.1 Diamine Used in Synthesis of Polyamic Acid (B)

There are no particular restrictions on the diamine used in the synthesis of the polyamic acid (B) in the invention, but specific examples include 4,4'-diaminodiphenylsulfone, 3,3'-diaminodiphenylsulfone, 3,4'-diaminodiphenylsulfone, bis[4-(4-amninophenoxy)phenyl]sulfone, bis[4-(3-aminophenoxy)phenyl]sulfone, bis[3-(4-aminophenoxy)phenyl]sulfone, [4-(4-aminophenoxy)phenyl][3-(4-aminophenoxy)phenyl]sulfone, [4-(3-aminophenoxy)phenyl][3-(4-aminophenoxy)phenyl]sulfone, compounds expressed by the above-mentioned Formula (b), 4,4'-diaminodiphenylmethane, 3,3'-diaminodiphenylmethane, 3,3'-dimethyl-4,4'-diaminodiphenylmethane, 2,2-bis[4-(4-aminophenoxy)phenyl]propane, 2,2-bis[4-(4-aminophenoxy)phenyl]hexafluoropropane, m-phenylenediamine, p-phenylenediamine, m-xylylenediamine, p-xylylenediamine, 2,2'-diaminodiphenylpropane, benzidine, 1,1-bis[4-(4-aminophenoxy)phenyl]cyclohexane, 1,1-bis[4-(4-(4-aminophenoxy)phenyl]-4-methylcyclohexane, bis[4-(4-aminobenzyl)phenyl]methane, 1,1-bis[4-(4-aminobenzyl)phenyl]cyclohexane, 1,1-bis[4-(4-aminobenzyl)phenyl]-4-methylcyclohexane, 1,1-bis[4-(4-aminobenzyl)phenyl]cyclohexane, 1,1-bis[4-(4-aminobenzyl)phenyl]-4-methylcyclohexane, 1,1-bis[4-(4-aminobenzyl)phenyl]methane, and compounds expressed by the following Formulas 1 to 172.

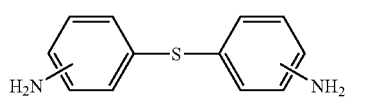

1

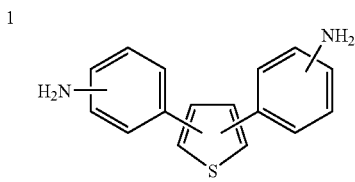

2

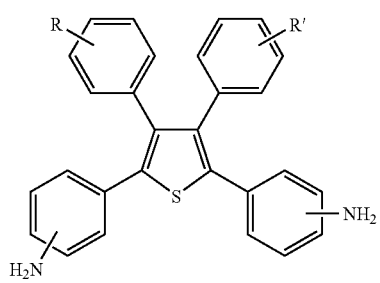

3

R, R' = H, CH$_3$, C$_2$H$_5$, C$_3$H$_7$, C$_4$H$_9$, C$_5$H$_{11}$
OCH$_3$, OC$_2$H$_5$, OC$_3$H$_7$, Cl, Br, I, OH

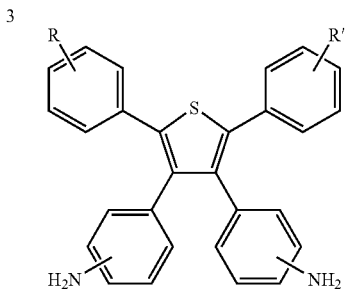

4

R, R' = H, CH$_3$, C$_2$H$_5$, C$_3$H$_7$, C$_4$H$_9$, C$_5$H$_{11}$
OCH$_3$, OC$_2$H$_5$, OC$_3$H$_7$, Cl, Br, I, OH

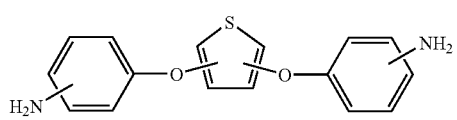

5

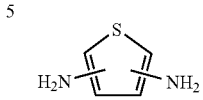

6

7

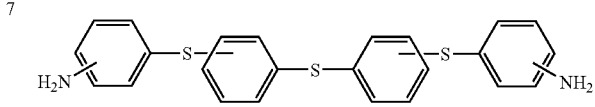

8

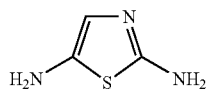

9

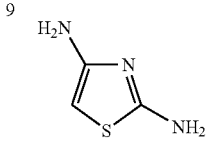

10

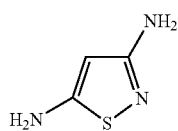

11

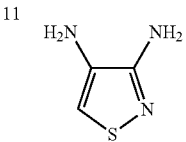

12

-continued

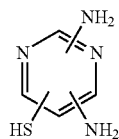
13

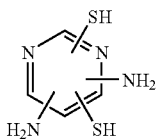
14

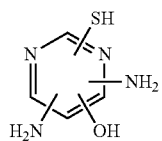
15

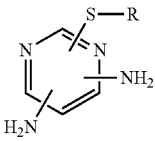
16

R = CH₃, C₂H₅, C₃H₇, C₄H₉,
C₅H₁₁, C₆H₁₃, C₇H₁₅

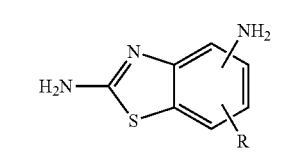
17

R = H, CH₃, C₂H₅, C₃H₇, C₄H₉, C₅H₁₁
OCH₃, OC₂H₅, OC₃H₇, Cl, Br, I, OH

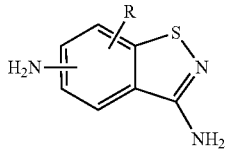
18

R = H, CH₃, C₂H₅, C₃H₇, C₄H₉, C₅H₁₁
OCH₃, OC₂H₅, OC₃H₇, Cl, Br, I, OH

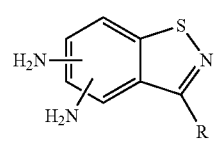
19

R = H, CH₃, C₂H₅, C₃H₇, C₄H₉, C₅H₁₁
OCH₃, OC₂H₅, OC₃H₇, Cl, Br, I, OH

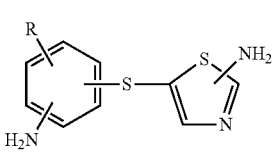
20

R = H, CH₃, C₂H₅, C₃H₇, C₄H₉, C₅H₁₁
OCH₃, OC₂H₅, OC₃H₇, Cl, Br, I, OH

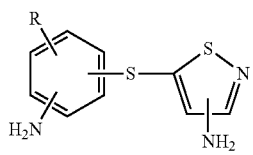
21

R = H, CH₃, C₂H₅, C₃H₇, C₄H₉, C₅H₁₁
OCH₃, OC₂H₅, OC₃H₇, Cl, Br, I, OH

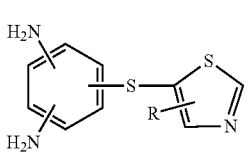
22

R = H, CH₃, C₂H₅, C₃H₇, C₄H₉, C₅H₁₁
OCH₃, OC₂H₅, OC₃H₇, Cl, Br, I, OH

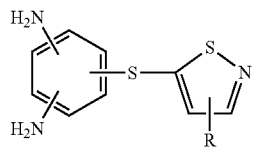
23

R = H, CH₃, C₂H₅, C₃H₇, C₄H₉, C₅H₁₁
OCH₃, OC₂H₅, OC₃H₇, Cl, Br, I, OH

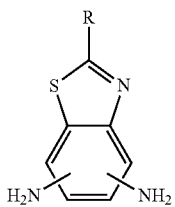
24

R = H, CH₃, C₂H₅, C₃H₇, C₄H₉, C₅H₁₁
OCH₃, OC₂H₅, OC₃H₇, Cl, Br, I, OH

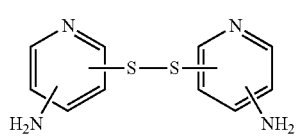
25

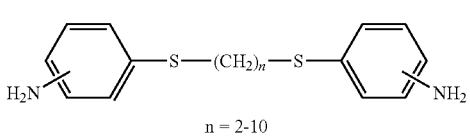
26 n = 2-10

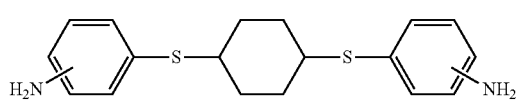
27

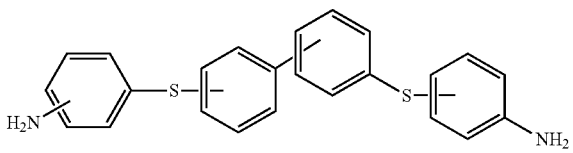
28

-continued
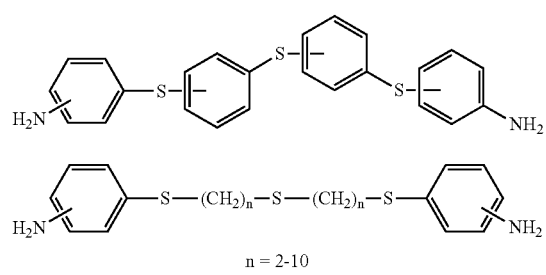
29
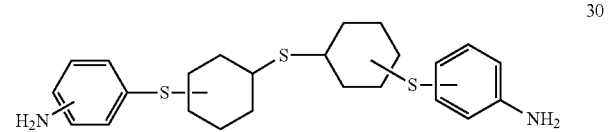
30
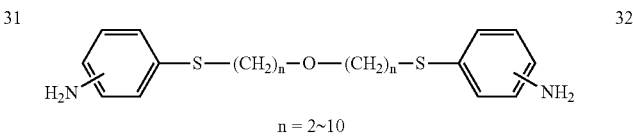
31
n = 2-10
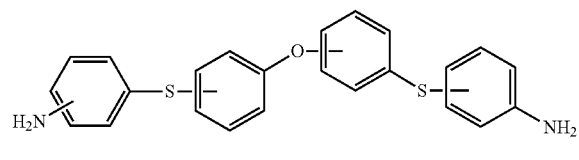
32
n = 2~10
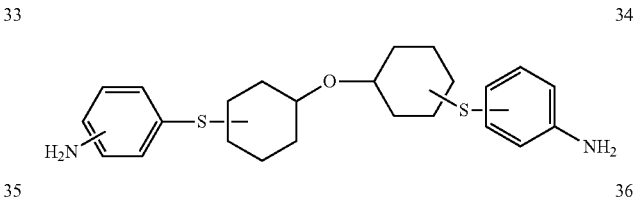
33
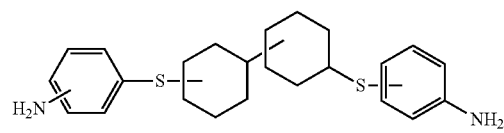
34
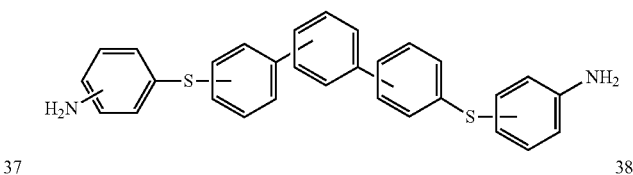
35
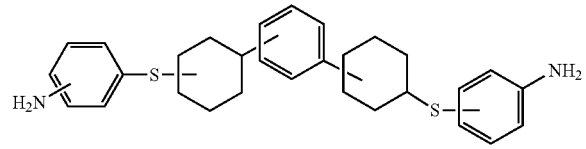
36
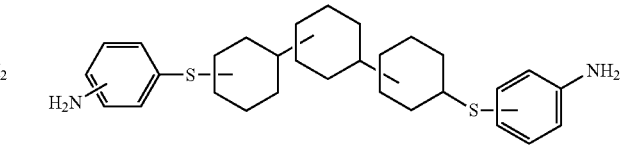
37
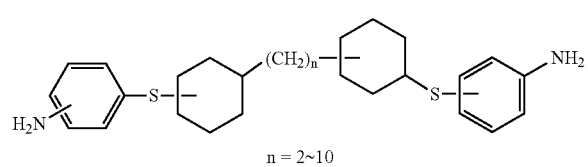
38
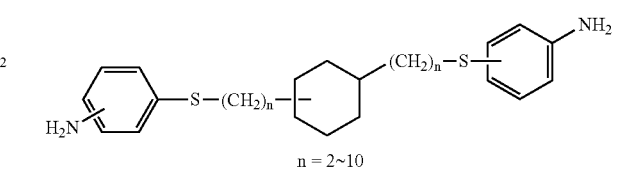
39
n = 2~10
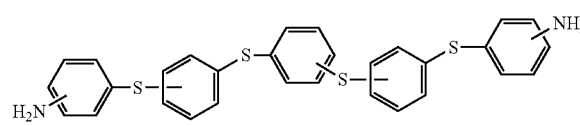
40
n = 2~10
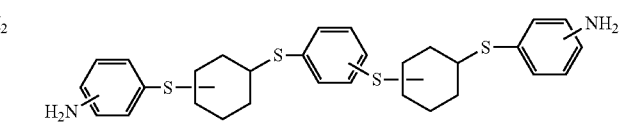
41
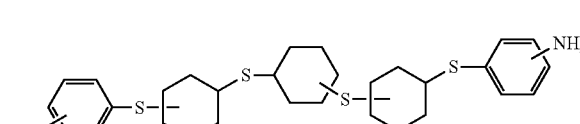
42
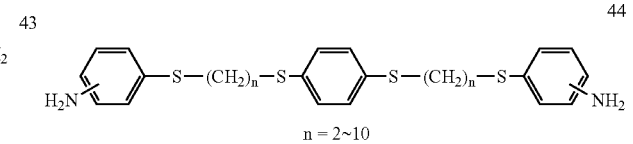
43
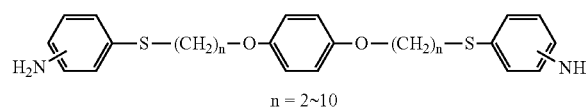
44
n = 2~10
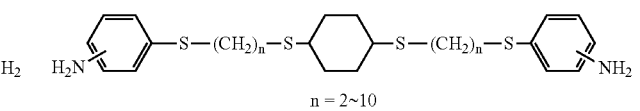
45
n = 2~10
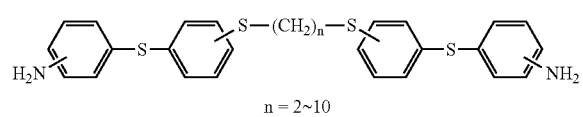
46
n = 2~10
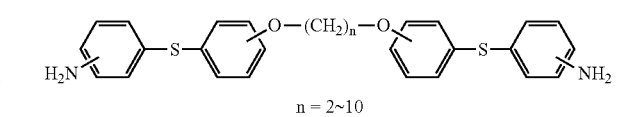
47
n = 2~10
48
n = 2~10

-continued
49
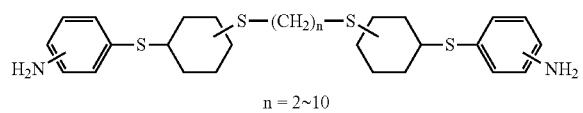
n = 2~10
50
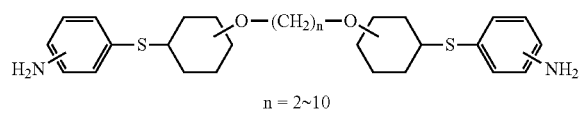
n = 2~10
51
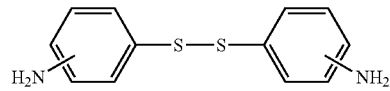
52
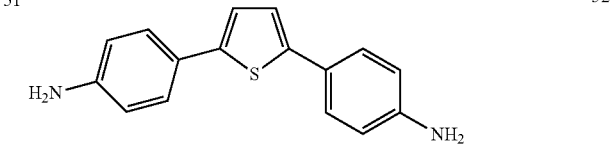
53
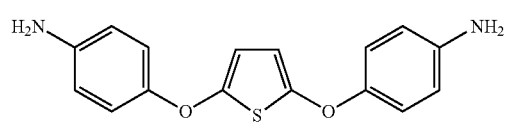
54
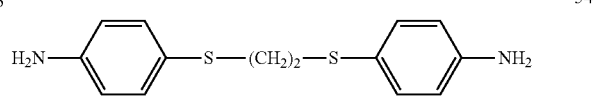
55
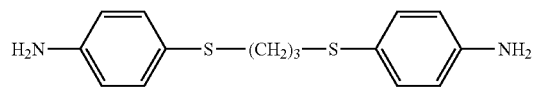
56
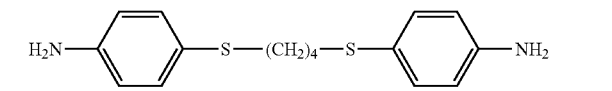
57
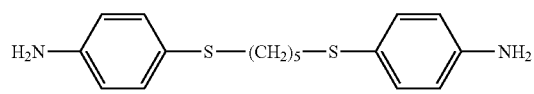
58
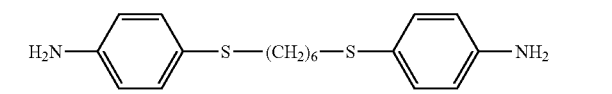
59
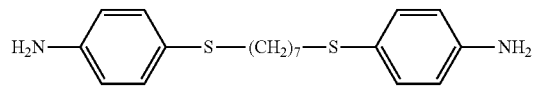
60
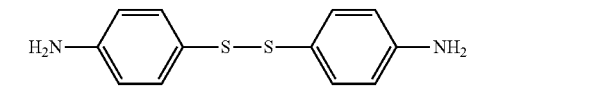
61
62
63
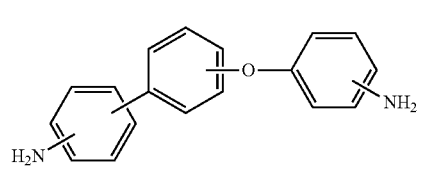
64
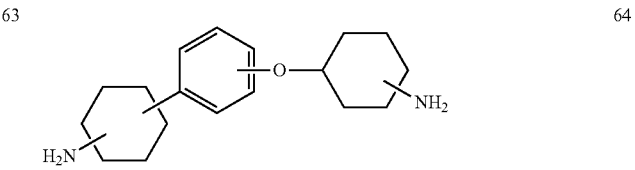
65
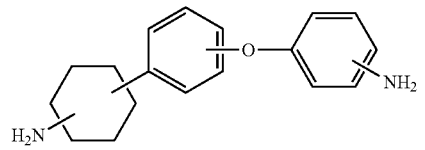
66
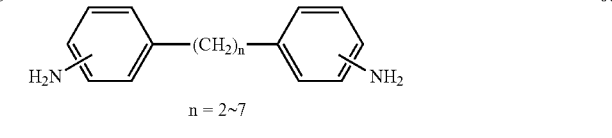
n = 2~7
67
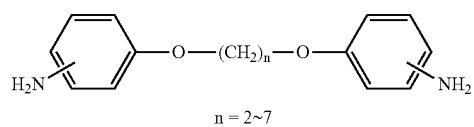
n = 2~7
68
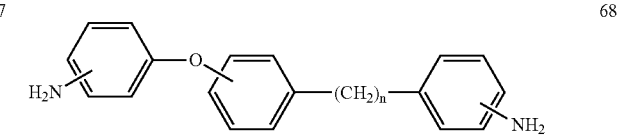
n = 2~7
69
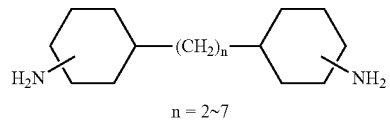
n = 2~7
70
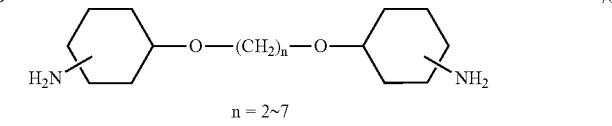
n = 2~7

-continued
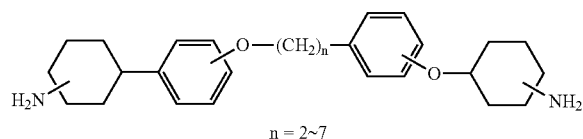
71
n = 2~7
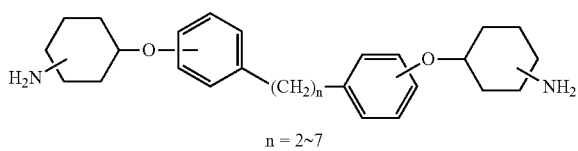
72
n = 2~7
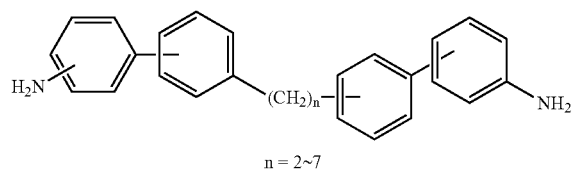
73
n = 2~7
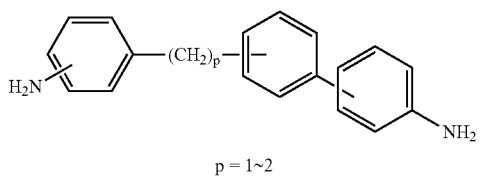
74
p = 1~2
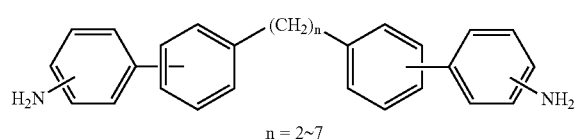
75
n = 2~7
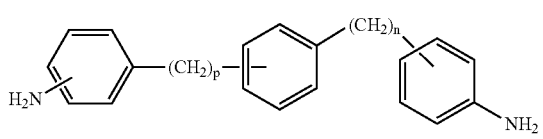
76
n = 2~7, p = 1~2
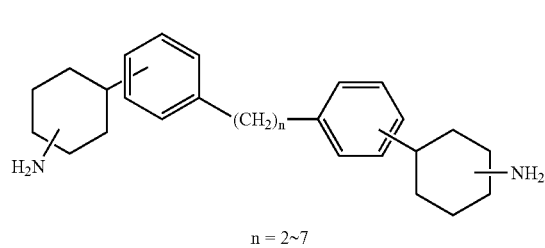
77
n = 2~7
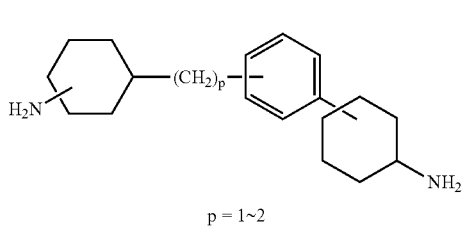
78
p = 1~2
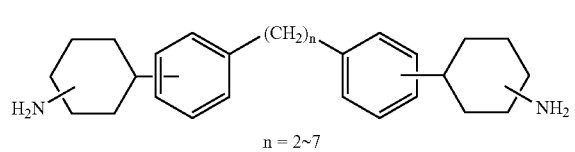
79
n = 2~7
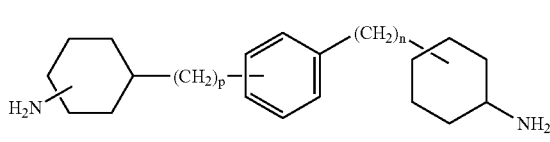
80
n = 2~7, p = 1~2
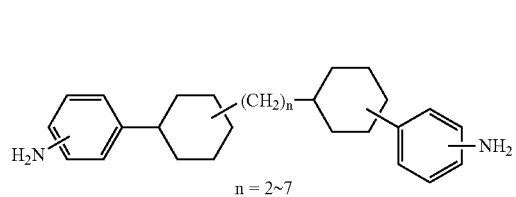
81
n = 2~7
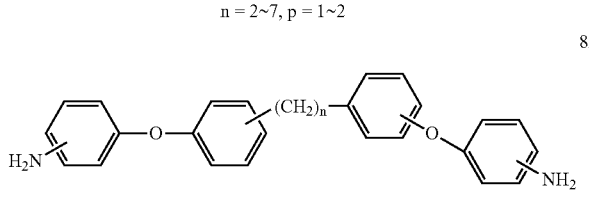
82
n = 2~7
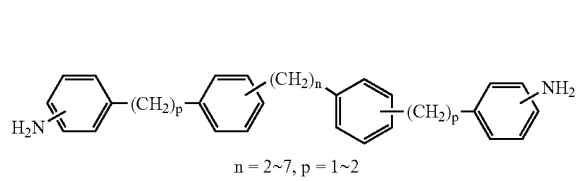
83
n = 2~7, p = 1~2
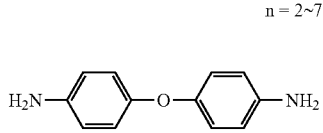
84
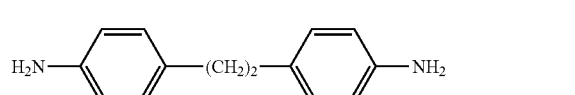
85
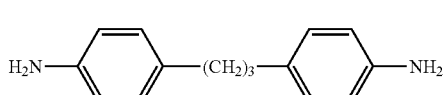
86
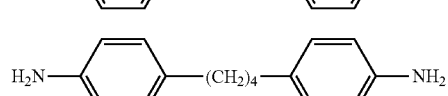
87
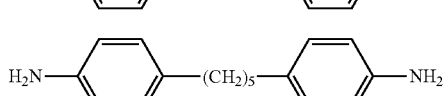
88
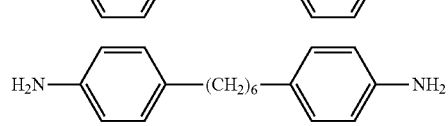
89
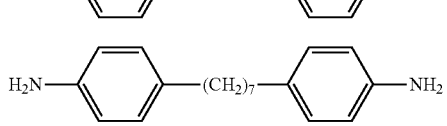
90

-continued
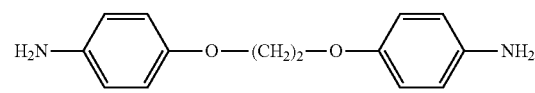 91
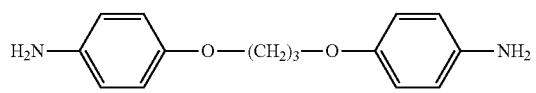 92
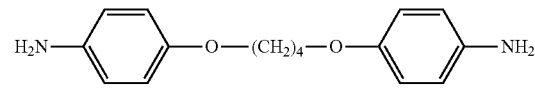 93
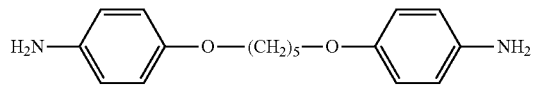 94
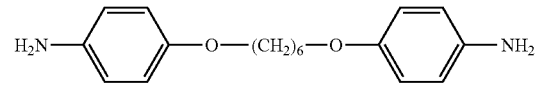 95
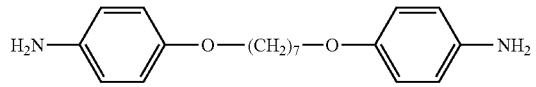 96
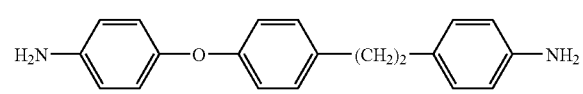 97
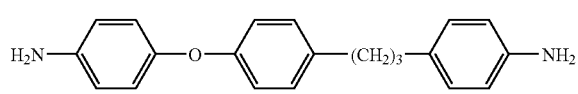 98
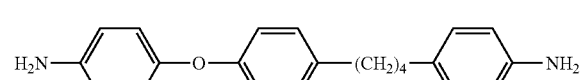 99
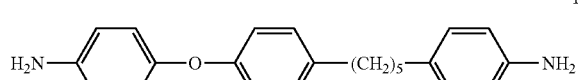 100
 101
 102
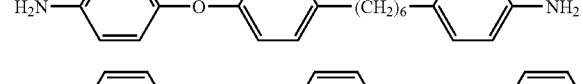 103
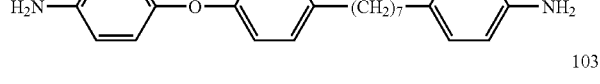 104
 105
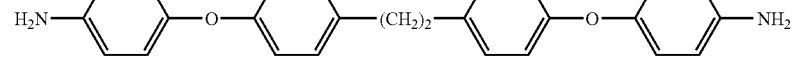 106
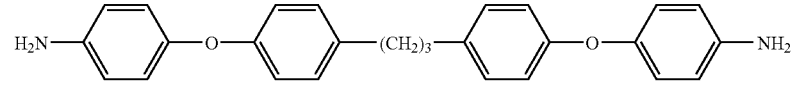 107
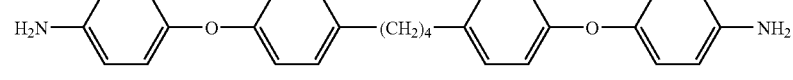 108
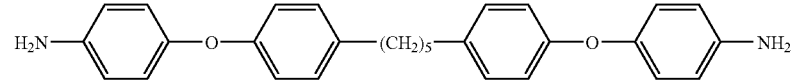 109
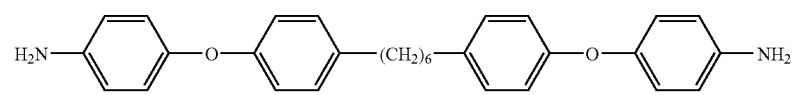 110
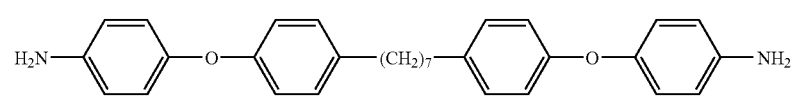 111
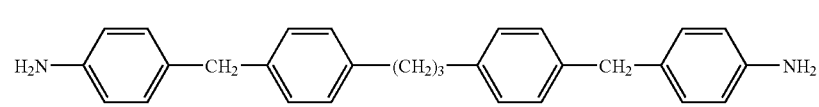 112
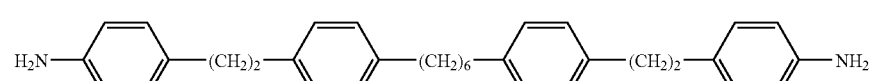 
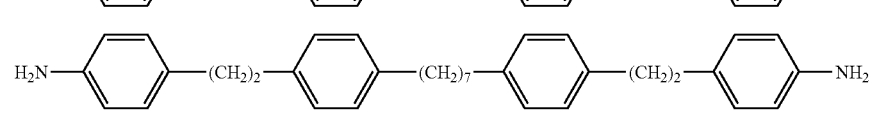

-continued
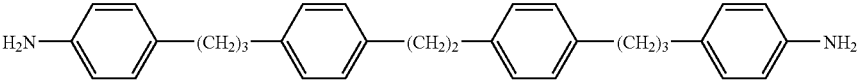
113
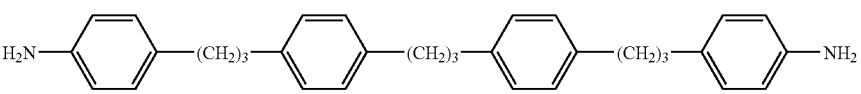
114
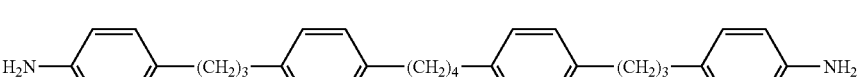
115
116
117
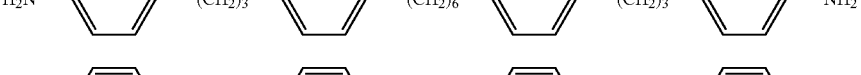
118
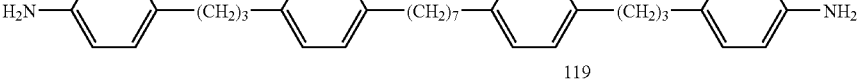
119
120
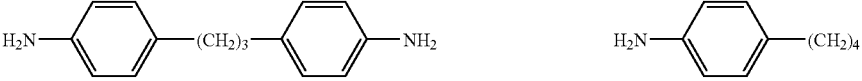
121
122
123
124
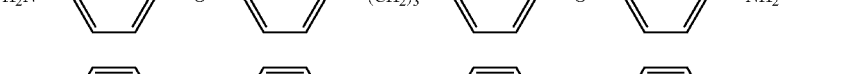
125
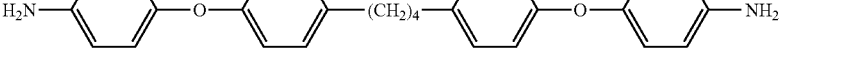
126
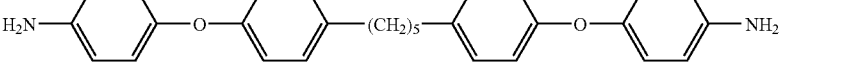
127
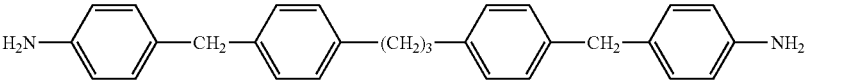
128
129
130
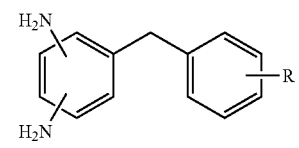
131
R = $CH_3$, $C_2H_5$, $C_3H_7$, $C_4H_9$, $C_5H_{11}$

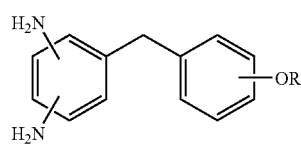
R = CH₃, C₂H₅, C₃H₇, C₄H₉, C₅H₁₁
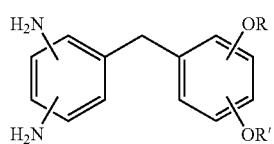
R = CH₃, C₂H₅, C₃H₇, C₄H₉, C₅H₁₁
R' = CH₃, C₂H₅, C₃H₇, C₄H₉, C₅H₁₁
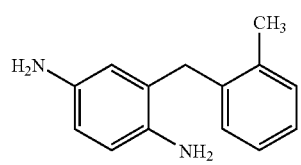
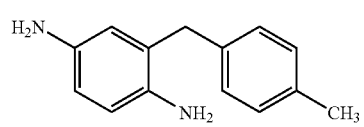
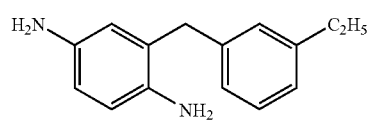
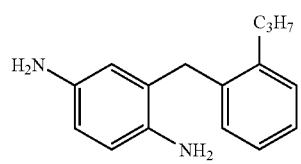
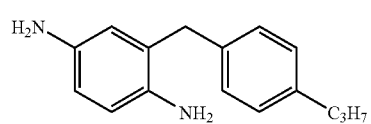
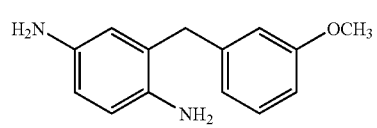
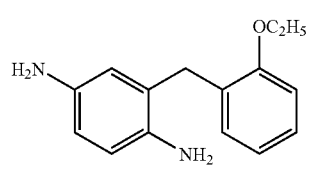
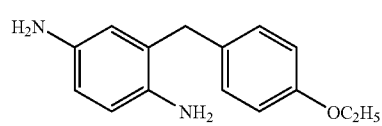
-continued
132 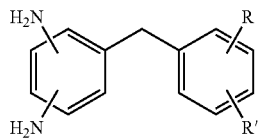 133
R = CH₃, C₂H₅, C₃H₇, C₄H₉, C₅H₁₁
R' = CH₃, C₂H₅, C₃H₇, C₄H₉, C₅H₁₁
134 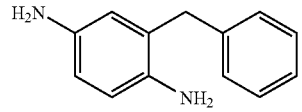 135
136 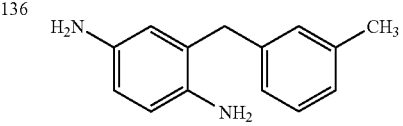 137
138 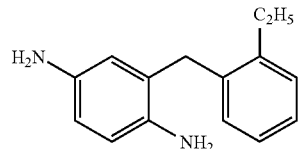 139
140 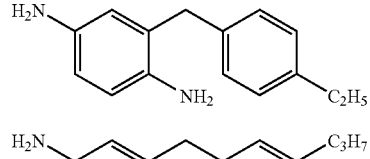 141
142 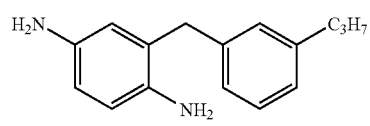 143
144 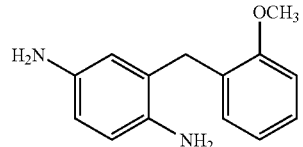 145
146 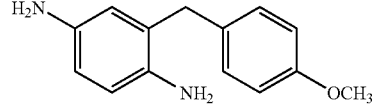 147
148 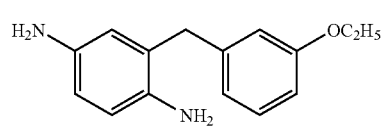 149
150 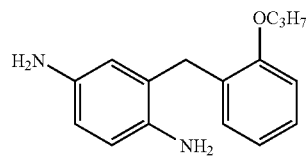 151

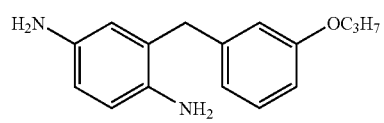 152
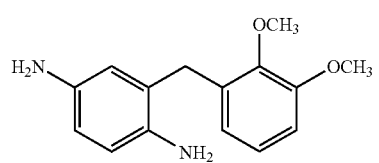 154
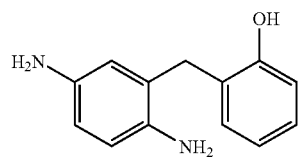 156
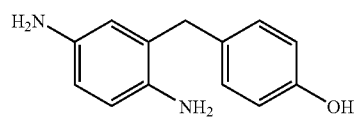 158
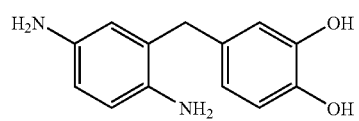 160
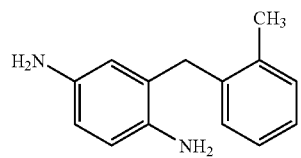 162
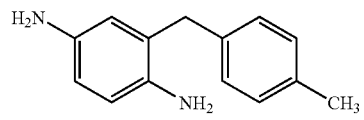 164
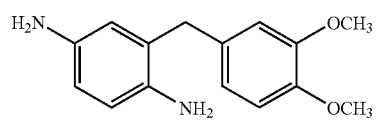 166
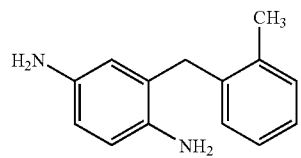 168
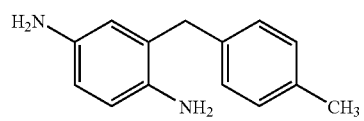 170
-continued
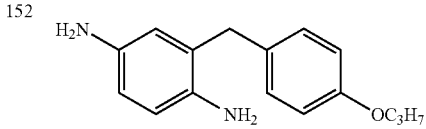 153
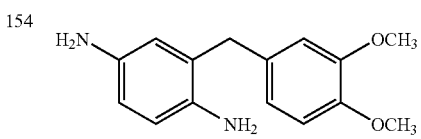 155
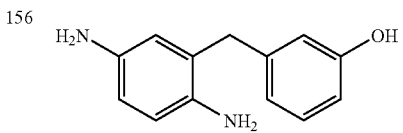 157
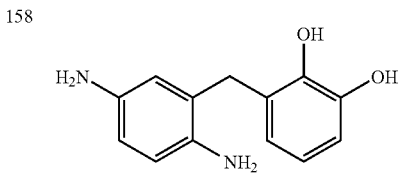 159
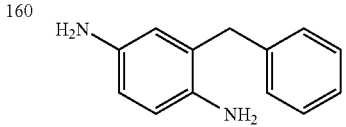 161
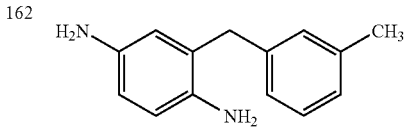 163
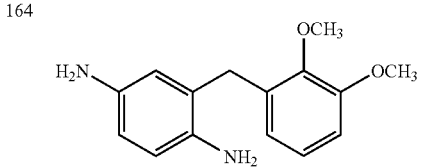 165
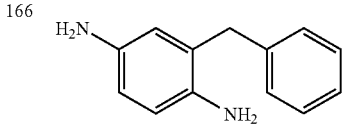 167
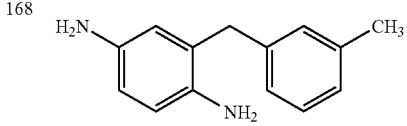 169
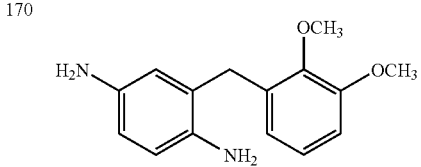 171

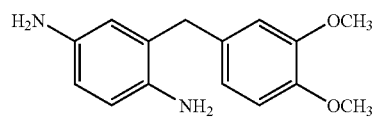

172

From the standpoint of increasing the liquid crystal molecular alignment of the resulting overcoat film, for example, of the specific examples of the diamine given above, 4,4'-diaminodiphenylmethane, 3,3'-diaminodiphenylmethane, 3,3'-dimethyl-4,4'-diaminodiphenylmethane, 2,2-bis[4-(4-aminophenoxy)phenyl]propane, 2,2-bis[4-(4-aminophenoxy)phenyl]hexafluoropropane, m-phenylenediamine, p-phenylenediamine, m-xylylenediamine, p-xylylenediamine, 2,2'-diaminodiphenylpropane, benzidine, 1,1-bis[4-(4-aminophenoxy)phenyl]cylcohexane, 1,1-bis[4-(4-aminophenoxy)phenyl]-4-methylcyclohexane, bis[4-(4-aminobenzyl)phenyl]methane, 1,1-bis[4-(4-aminobenzyl)phenyl]cyclohexane, 1,1-bis[4-(4-aminobenzyl)phenyl]-4-methylcyclohexane and 1,1-bis[4-(4-aminobenzyl)phenyl]methane are preferable.

These diamines can be used singly or as a combination of two or more types.

2.2 Compound Having Acid Anhydride Groups Used in Synthesis of Polyamic Acid (B)

There are no particular restrictions on the compound having an acid anhydride group used in the synthesis of the polyamic acid (B) in the, but specific examples include styrene/maleic anhydride copolymers, 4-(2,5-dioxotetrahydrofuran-3-yl)-1,2,3,4-tetrahydronaphthalene-1,2-dicarboxylic anhydride, 5-(2,5-dioxotetrahydrofuryl)-3-methyl-3-cyclohexene-1,2-dicarboxylic anhydride, and compounds expressed by the following Formulas 173 to 219.

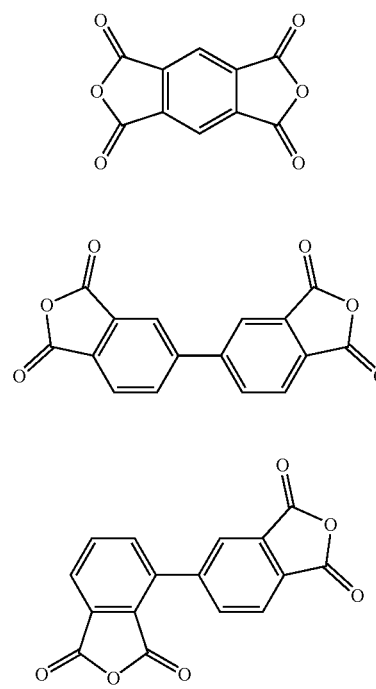

173

174

175

-continued

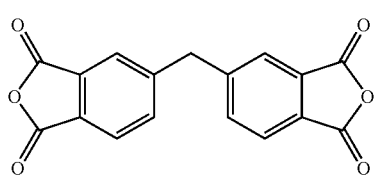

176

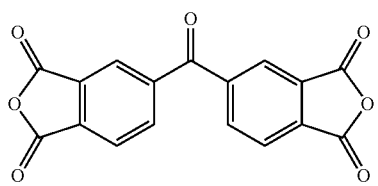

177

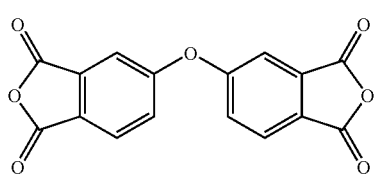

178

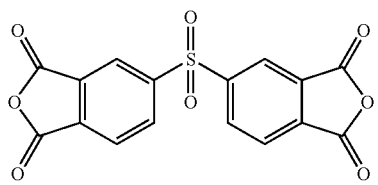

179

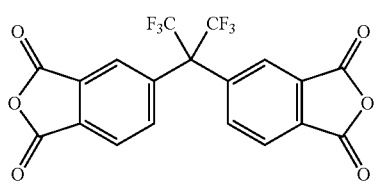

180

181

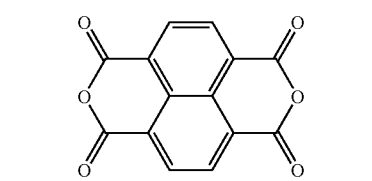

182

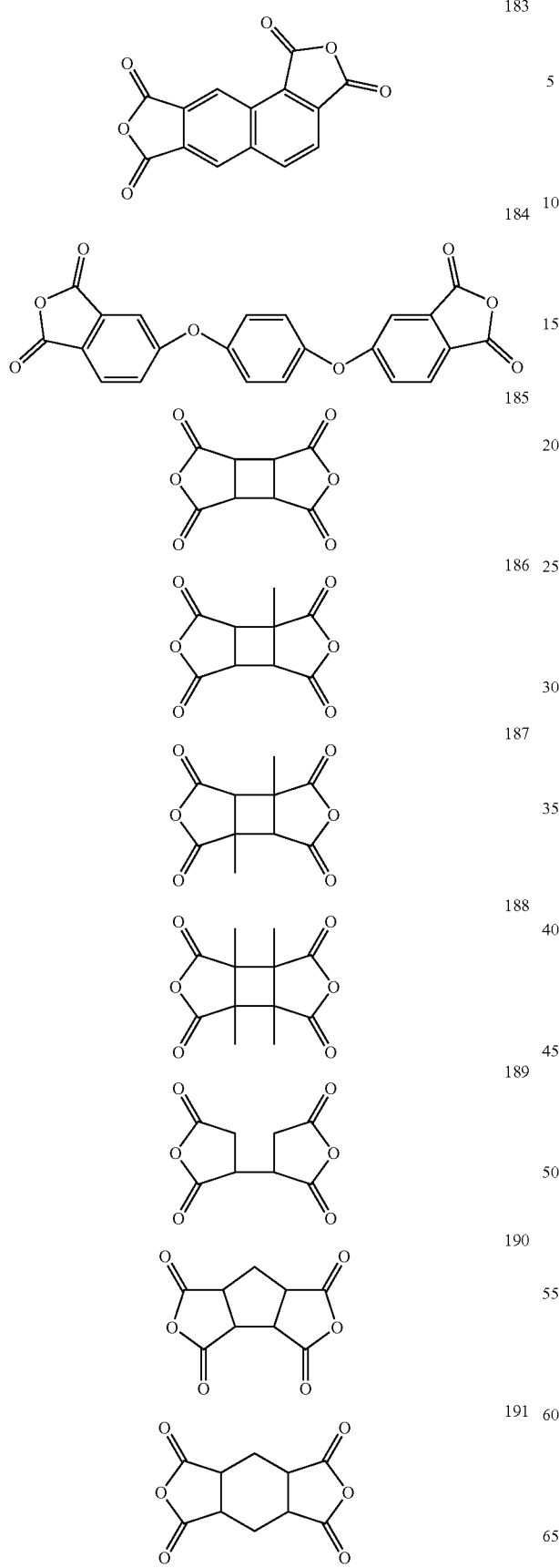
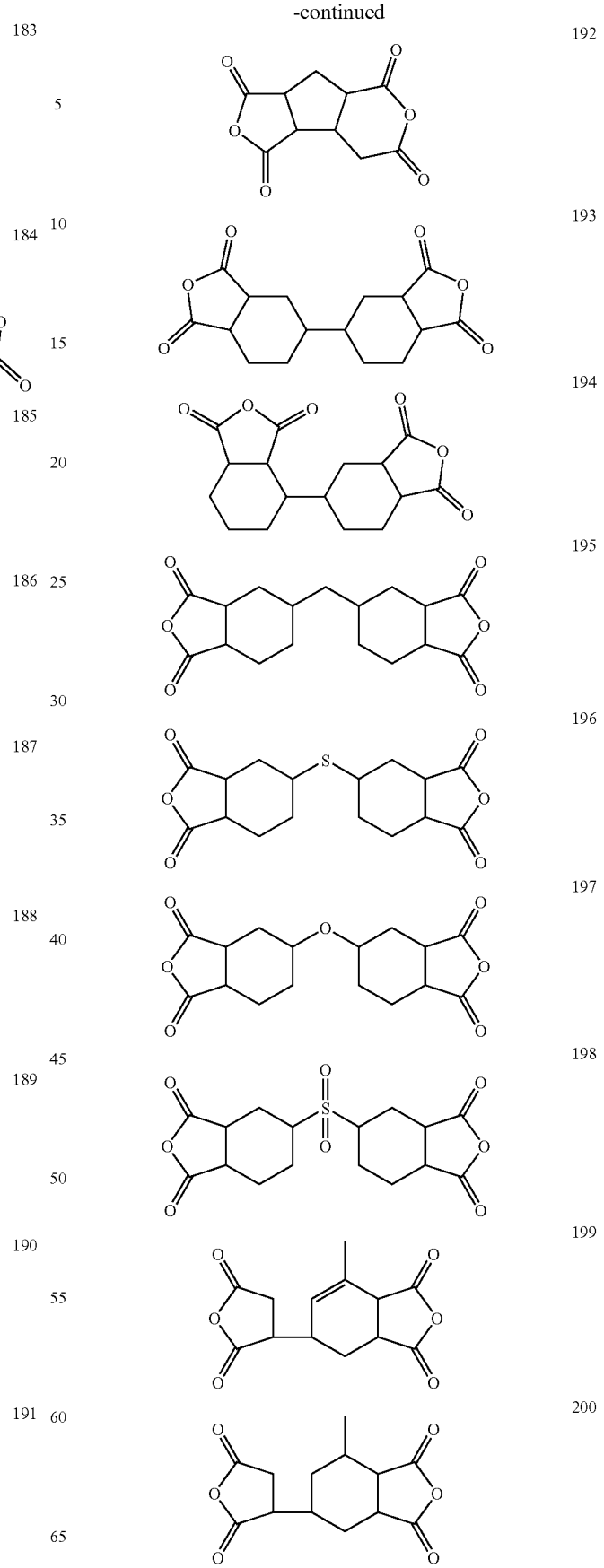

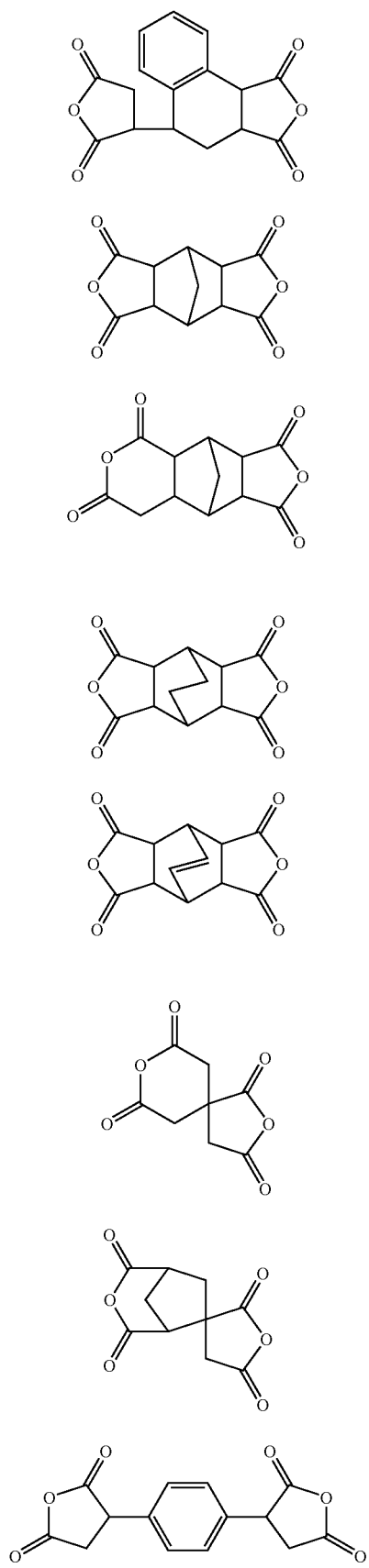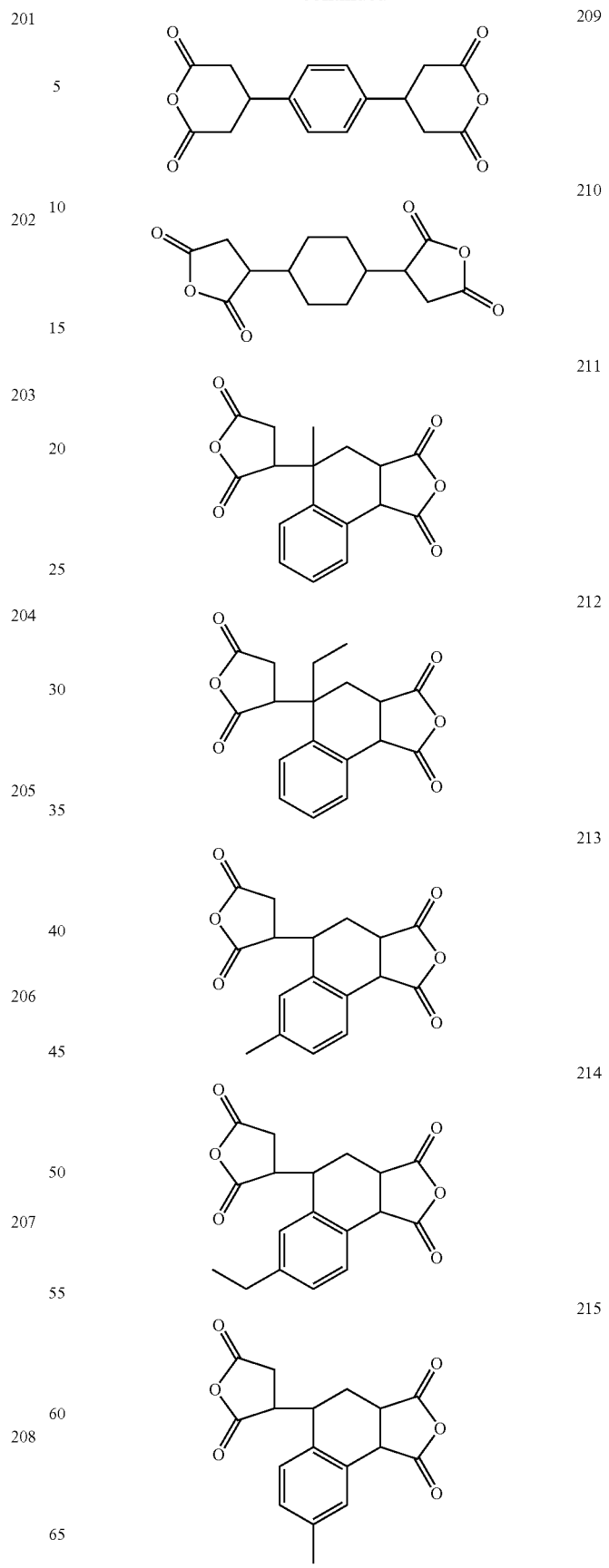

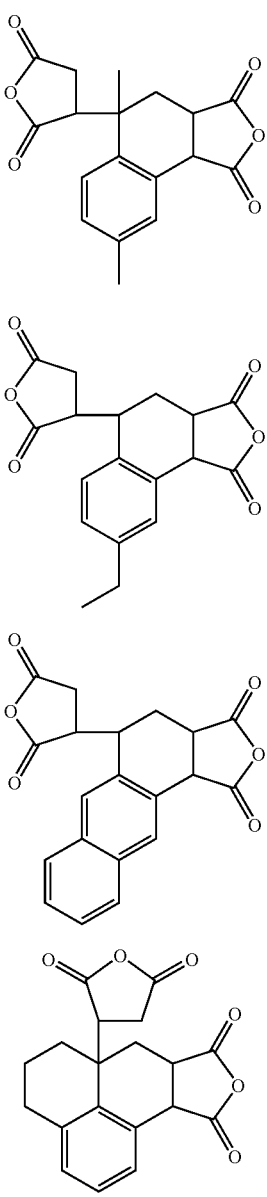

Of the specific examples of the compounds having an acid anhydride group expressed by the above Formulas 173 to 219 and used to synthesize the polyamic acid (B), compounds expressed by Formulas 173, 177, 178, 179, 180, 181, 185, 189, and 191 are preferable.

The compounds having an acid anhydride group listed above may be used singly or in combinations of two or more types.

2.3 Additives Added to Polyamic Acid (B)

When the polyamic acid (B) used in the invention has acid anhydride groups at its molecular terminals, a monohydric alcohol can be added and reacted as needed. A polyamic acid (B) to which a monohydric alcohol has been added is preferable because of flatness of the coating film that is obtained will be better, for example. Examples of the monohydric alcohol added here are the same as those given for the monohydric alcohol added to the polyester-polyamic acid (A1).

A silicon-containing monoamine is preferably reacted with the polyamic acid (B), because this will improve the chemical resistance of the coating film that is obtained, for example. Examples of silicon-containing monoamine added here are the same as those given for the silicon-containing monoamine added to the polyester-polyamic acid (A1).

A monohydric alcohol and a silicon-containing monoamine can also be simultaneously added to and reacted with the polyamic acid (B).

2.4 Reaction Conditions

The polyamic acid (B) is preferably obtained by reacting approximately 0.8 to approximately 1.2 mol of an acid anhydride of a compound having an acid anhydride group, and more preferably obtained by reacting approximately 0.9 to approximately 1.1 mol of an acid anhydride of a compound having an acid anhydride group, per mole of amino groups of the diamine (a2).

There are no particular restrictions on the solvent used to obtain the polyamic acid (B), as long as it allows this compound to be synthesized, but the same solvent as that used to obtain the polyester-polyamic acid (A1) can be used, for example.

It is preferable for the solvent to be used in an amount of at least approximately 100 weight parts per combined approximately 100 weight parts of the diamine and the compound having an acid anhydride group, because the reaction will proceed more smoothly. The reaction is preferably conducted at approximately 40° C. to approximately 200° C. for approximately 0.2 to approximately 20 hours.

If a silicon-containing monoamine is added to and reacted with the polyamic acid (B), it is preferable to add the silicon-containing monoamine after the reaction between the diamine and the compound having an acid anhydride group has concluded, and after the reaction solution has cooled to approximately 40° C. or lower, and for the reaction to be conducted at approximately 100° C. to approximately 40° C. for approximately 0.1 to approximately 6 hours.

There are no particular restrictions on the order in which the raw materials are added to the reaction system. Specifically, the diamine and the compound having an acid anhydride group can both be added at the same time to the solvent; the diamine can be added to the solvent, after which the compound having an acid anhydride group is added; or another such method can be employed.

3 Epoxy Resin (C)

The overcoat film composition of the invention may also include an epoxy resin (C) if necessary. There are no particular restrictions on the epoxy resin (C) used in the invention, as long as it has an oxirane group, but a compound having two or more oxirane groups is preferable.

There are no particular restrictions on the concentration of the epoxy resin in the overcoat film composition in the invention, but approximately 0.5 to approximately 20 wt % is preferable, and approximately 2 to approximately 15 wt % is more preferable. These concentration ranges are preferable because the heat resistance and the chemical resistance of the coating film formed from the overcoat film composition will be better.

Specific examples of the epoxy resin (C) include bisphenol A-type epoxy resins, glycidyl ester-type epoxy resins, alicyclic epoxy resins, polymers of monomers having oxirane groups, and copolymers of monomers having oxirane groups and other monomers.

Specific examples of these epoxy resins include Epikote 807™, Epikote 815™, Epikote 825™, Epikote 827™, Epikote 828™, which are compounds expressed by the above-mentioned Formula 223, Epikote 190P™, Epikote 191P™ (Yuka Shell Epoxy); Epikote1004™, Epikote1256™ (Japan Epoxy Resins Co., Ltd); Araldite CY177™, Araldite CY184™, which are compounds expressed by the above-mentioned Formula 220 (the above are product names of Ciba-Geigy Japan); Celloxide 2021P, which is a compound expressed by the above-mentioned Formula 221, and EHPE- 3150™ (Daicel Chemical Industries); and Techmore VG3101L™, which is a compound expressed by the above-mentioned Formula 222 (Mitsui Chemical). Of these, Epikote 828™, which is a mixture of compounds expressed by Formula 223 in which n=0 to 4, Araldite CY184™, which is a compound expressed by Formula 220 (Ciba-Geigy Japan), Celloxide 2021P™, which is a compound expressed by Formula 221 (Daicel Chemical Industries), and Techmore VG3101L™, which is a compound expressed by Formula 222 (Mitsui Chemical) are preferable because they afford better transparency and flatness of the coating film that is obtained.

Specific examples of monomers having oxirane groups include glycidyl(meth)acrylate, 3,4-epoxycyclohexyl(meth)acrylate, and methylglycidyl(meth)acrylate.

Specific examples of the other monomers copolymerized with the monomers having oxirane groups include (meth)acrylic acid, methyl(meth)acrylate, ethyl(meth)acrylate, isopropyl(meth)acrylate, butyl(meth)acrylate, iso-butyl(meth)acrylate, t-butyl(meth)acrylate, cyclohexyl(meth)acrylate, benzyl(meth)acrylate, 2-hydroxyethyl(meth)acrylate, 2-hydroxypropyl(meth)acrylate, styrene, methylstyrene, chloromethylstyrene, (3-ethyl-3-oxetanyl)methyl(meth)acrylate, N-cyclohexylmaleimide, and N-phenylmaleimide.

Specific preferred examples of polymers of monomers having oxirane groups include polyglycidyl methacrylate. Specific preferred examples of copolymers of monomers having oxirane groups and other monomers include copolymers of methyl methacrylate and glycidyl methacrylate, copolymers of benzyl methacrylate and glycidyl methacrylate, copolymers of butyl methacrylate and glycidyl methacrylate, copolymers of 2-hydroxyethyl methacrylate and glycidyl methacrylate, copolymers of (3-ethyl-3-oxetanyl)methyl methacrylate and glycidyl methacrylate, and copolymers of styrene and glycidyl methacrylate.

4 Additives Added to the Overcoat Film Composition of the Invention

The overcoat film composition of the invention is obtained by mixing one or more members selected from the group of polyester-polyamic acids (A1) and polyester-polyimides (A2) that are imidization products thereof and a polyamic acid (B), and, if needed, also an epoxy resin (C). Furthermore, depending on the desired characteristics, the overcoat film composition of the invention can be obtained by adding a surfactant, anti-static agent, coupling agent, epoxy curing agent (such as trimellitic acid), aminosilicon compound, solvent, or other additives that are selected as needed, and uniformly mixing and dissolving these components.

(1) Surfactant

If coatability is to be improved, for instance, a surfactant that meets this objective can be added. Specific examples of surfactants that can be added to the overcoat film composition of the invention include BYK-300™, BYK-306™, BYK-335™, BYK-310™, BYK-341™, BYK-344™, BYK-370™ (BYK Chemie), and other such silicon-based surfactants, BYK-354™, BYK-358™, BYK-361™ (BYK Chemie), and other such acrylic surfactants, and DFX-18™, Ftergent 250™, Ftergent 251™ (Neos), and other such fluorine-based surfactants.

These surfactants may be used singly or as mixtures of two or more types.

A surfactant is used to improve underlying substrate wettability, flatness, and coatability, and is preferably added in an amount of approximately 0.01 to approximately 1 wt % in the overcoat film composition.

(2) Anti-Static Agent

There are no particular restrictions on the anti-static agent added to the overcoat film composition of the invention, and any ordinary anti-static agent can be used, but specific examples include tin oxide, compound oxides of tin oxide and antimony oxide, compound oxides of tin oxide and indium oxide, and other such metal oxides, as well as quaternary ammonium salts. These anti-static agents may be used singly or as a mixture of two or more types.

An anti-static agent is used to prevent charging, and is preferably added in an amount of approximately 0.01 to approximately 1 wt % in the overcoat film composition.

(3) Coupling Agent

There are no particular restrictions on the coupling agent added to the overcoat film composition of the invention, and any ordinary coupling agent can be used, but it is preferable to add a silane coupling agent, specific examples of which include trialkoxysilane compounds and dialkoxysilane compounds. Favorable examples include γ-vinylpropyltrimethoxysilane, γ-vinylpropyltriethoxysilane, γ-acryloylpropylmethyldimethoxysilane, γ-acryloylpropyl trimethoxysilane, γ-acryloylpropylmethyldiethoxysilane, γ-acryloylpropyltriethoxysilane, γ-methacryloylpropylmethyldimethoxysilane, γ-methacryloylpropyltrimethoxysilane, γ-methacryloylpropylmethyldiethoxysilane, γ-methacryloylpropyltriethoxysilane, γ-glycidoxypropylmethyldimethoxysilane, γ-glycidoxypropyltrimethoxysilane, γ-glycidoxypropylmethyldiethoxysilane, γ-glycidoxypropyltriethoxysilane, γ-aminopropylmethyl dimethoxysilane, γ-aminopropyltrimethoxysilane, γ-aminopropylmethyldimethoxysilane, γ-aminopropyltriethoxysilane, N-aminoethyl-γ-iminopropylmethyldimethoxysilane, N-aminoethyl-γ-aminopropyltrimthoxysilane, N-aminoethyl-γ-aminopropyldiethoxysilane, N-phenyl-γ-aminopropyltrimthoxysilane, N-phenyl-γ-aminopropyltriethoxysilane, N-phenyl-γ-aminopropyl methyldimethoxysilane, N-phenyl-γ-aminopropylmethyldiethoxysilane, γ-mercaptopropylmethyl dimethoxysilane, γ-aminopropyltrimethoxysilane, γ-mercaptopropylmethyldiethoxysilane, γ-mercaptopropyltriethoxysilane, γ-isocyanatopropylmethyldiethoxysilane, and γ-isocyanatopropyl triethoxysilane. Of these, γ-vinylpropyltrimethoxysilane, γ-acryloylpropyl trimethoxysilane, γ-methacryloylpropyltrimethoxysilane, γ-isocyanatopropyltriethoxysilane, and so forth are preferable.

These coupling agents may be used singly or as mixtures of two or more types.

The coupling agent is preferably added in an amount of approximately 0.01 to approximately 3 wt % in the overcoat film composition.

(4) Epoxy Curing Agent

There are no particular restrictions on the epoxy curing agent added to the overcoat film composition of the invention, and any ordinary epoxy curing agent can be used, but specific examples include organic acid dihydrazide compounds, imidazole and its derivatives, dicyandiamide, aromatic amines, polyvalent carboxylic acids, and polyvalent carboxylic anhydrides. More specifically, examples include dicyandiamides such as dicyandiamide, organic acid hydrazides such as dihydrazide adipate and 1,3-bis(hydrazinocarboethyl)-5-isopropylhydantoin, imidazole derivatives such as 2,4-diamino-6-[2'-ethylimidazolyl-(1')]-ethyltriazine, 2-phenylimidazole, 2-phenyl-4-methlimidazole, 2-phenyl-4-methyl-5-hydroxymethylimidazole, and acid anhydrides such as phthalic anhydride, trimellitic anhydride, 1,2,4-cyclohexanetricarboxylic acid-1,2-anhydride. Of these, trimellitic acid and 1,2,4-cyclohexanetricarboxylic acid-1,2-anhydride are preferable because they afford better transparency of the coating film that is obtained.

These epoxy curing agents may be used singly or as mixtures of two or more types.

The epoxy curing agent is preferably added in an amount of approximately 0.2 to approximately 5 wt % in the overcoat film composition.

(5) Aminosilicon Compound

An aminosilicon compound can be added to the overcoat film composition of the invention. Examples of aminosilicon compounds include para-aminophenyltrimethoxysilane, para-aminophenyltriethoxysilane, meta-aminophenyltrimethoxysilane, meta-aminophenyltriethoxysilane, aminopropyltrimethoxysilane, and aminopropyltriethoxysilane.

These aminosilicon compounds may be used singly or as mixtures of two or more types.

The epoxy curing agent is used to improve adhesion to a substrate, and is preferably added in an amount of approximately 0.05 to approximately 2 wt % in the overcoat film composition.

(6) Solvent

There are no particular restrictions on the solvents that can be contained in the overcoat film composition of the invention, as long as they are capable of dissolving the polyester-polyamic acid (A1), the polyester-polyimide (A2), the polyamic acid (B), and the epoxy resin (C). The solvent can be suitably selected as dictated by the intended use, and includes many solvents ordinarily used in the course of manufacturing soluble polyimides and other such polymer components, and in their applications.

Examples of these solvents are given below. Examples of aprotic, polar, organic solvents, which are miscible with polyamic acids and soluble polyimides, include N-methyl-2-pyrrolidone, dimethylimidazolinone, N-methylcaprolactam, N-methylpropioneamide, N,N-dimethylacetamide, dimethyl sulfoxide, N,N-dimethylformamide, N,N-diethylformamide, diethylacetamide, and γ-butyrolactone.

Examples of other solvents intended to improve coatability include alkyl lactate, 3-methyl-3-methoxybutanol, tetralin, isophorone, ethylene glycol monoalkyl ethers such as ethylene glycol monobutyl ether, diethylene glycol monoalkyl ethers such as diethylene glycol monoethyl ether, ethylene glycol monoalkyl, phenyl acetate, triethylene glycol monoalkyl ether, propylene glycol monoalkyl ethers such as propylene glycol monobutyl ether, dialkyl malonates such as diethyl malonate, dipropylene glycol monoalkyl ethers such as dipropylene glycol monomethyl ether, and acetates and other such esters of these. Of these solvents, it is particularly favorably to use N-methyl-2-pyrrolidone, dimethylimidazolinone, γ-butyrolactone, ethylene glycol monobutyl ether, diethylene glycol monoethyl ether, propylene glycol monobutyl ether, dipropylene glycol monomethyl ether, propylene glycol monomethyl ether acetate, diethylene glycol methylethyl ether, methyl 3-methoxypropionate, and so forth.

These solvents may be used singly or as mixtures of two or more types. The solvent is preferably added such that the solids concentration in the overcoat film composition will be from approximately 5 to approximately 60 wt %.

(7) Other Additives

To the extent that the characteristics of the invention are not compromised, the overcoat film composition of the invention can also be used as a mixture with a soluble polyimide, polyester, acrylic acid polymer, acrylate polymer, or other such polymer component (preferably within an amount of approximately 20 wt % of the overcoat film composition).

Also, a polyamide, which is a reaction product of a dicarboxylic acid or derivative thereof and a diamine, or a polyimide-amide, which is a reaction product of a tetracarboxylic dianhydride, a dicarboxylic acid, or a derivative thereof and a diamine, or another such polymer component can be added to the overcoat film composition of the invention to the extent that the object of the invention is not compromised.

5. Formation of Overcoat Film

The overcoat film composition of the invention can be made into a coating film by coating a substrate surface and then removing the solvent by heating with a hot plate, oven, or the like. The heating conditions will vary with the types of components and the proportions in which they are used, but usually a coating film is formed in approximately 5 to approximately 15 minutes or in approximately 1 to approximately 5 minutes when a hot plate is used or when a approximately 70° C. to approximately 120° C. oven is used.

Coating the substrate surface with the overcoat film composition can be accomplished by spin coating, roll coating, dipping, slit coating, or another ordinary method for forming a coating film.

After the coating film has been formed, it is cured by being heat treated at approximately 180° C. to approximately 250° C., and preferably approximately 200° C. to approximately 240° C., for approximately 30 to approximately 90 minutes when an oven is used, or for approximately 5 to approximately 30 minutes when a hot plate is used, which yields a cured film.

In the cured film thus obtained, the polyamic acid and the polyamic acid component of the polyester-polyamic acid have undergone dehydration cyclization, which forms imide bonds, and its characteristics as an aligning film are brought out by subjecting it to a rubbing treatment. This cured film can be easily removed with an alkali solution, and is an overcoat film with excellent reworkability.

Also, when the epoxy resin (C) is added, the epoxy resin will react with the free carboxylic acid of the polyester-polyamic acid simultaneously with the formation of the above-mentioned imide bonds, resulting in an overcoat film that is extremely tough, has excellent transparency, heat resistance, chemical resistance, flatness, adhesion, and sputtering resistance, and also has liquid crystal molecular alignment.

6. Display Element Substrate

The display element substrate of the invention has an overcoat film that has undergone an aligning treatment, and an optical film obtained by polymerizing a polymerizable liquid crystal composition formed on the overcoat film.

The display element substrate of the invention is obtained by coating a glass or other substrate with the overcoat film composition of the invention, then drying and heat treating this composition to bring about a dehydration ring-closure reaction and thereby form an overcoat film on the substrate. After the overcoat film undergoes an aligning treatment, the aligning film is coated with a polymerizable composition and polymerized, which forms an optical film in which the aligning state of the molecules that make up the liquid crystal composition is fixed.

Thus, the display element substrate of the invention has an optical compensation function. This display element substrate can have optical compensation layers having specific optical anisotropy formed independently for each specific pixel or in a specific region of a pixel.

There are no particular restrictions on the polymerizable liquid crystal composition used for the display element substrate of the invention, but a commercially available polymerizable liquid crystal composition can be used, for example. The polymerizable liquid crystal monomer contained in the polymerizable liquid crystal composition used for the display element substrate of the invention can be, for example, one of the monomers discussed in Japanese Laid-Open Patent Applications H9-316032 and H7-17910, pamphlet WO98/00428, Macromolecules, 26, 6132-6134 (1993), DE19504224-A1, Makromol. Chem., 190, 3201-3215 (1998), Japanese Laid-Open Patent Application 2003-48903, pamphlet WO97/00600, EP1205467-A1, Japanese Laid-Open Patent Application 2006-307150, etc.

7. Color Filter Substrate

The color filter substrate of the invention is constituted, for example, such that color filters of three colors R, G, and B (red, blue, and green) are formed on a glass substrate on which a black matrix has been formed, and an overcoat film composed of the overcoat film composition of the invention or the like is further formed.

Manufacturing the color filter substrate of the invention involves going through a step of forming a black matrix composed of chromium or another such metal on a glass or other transparent substrate by photolithography or etching, then using a resist pattern of the desired shape as a mask to perform etching for a specific color, and obtaining a color filter pattern, a step of then coating with the overcoat film composition of the invention, a step of then drying this film, and a step of performing the heat treatment necessary for a dehydration ring-closure reaction. If necessary, the overcoat film that constitutes the color filter substrate may be subjected to an aligning treatment.

The aligning performed in this aligning treatment may be rubbing, optical aligning, or any other commonly known method.

Rubbing is an aligning treatment method that can be used to particular advantage in the invention, and as long as the object of the invention can be achieved, there are no restrictions on the rubbing treatment conditions, but particularly favorable conditions are a bristle push-in depth of approximately 0.2 to approximately 0.8 mm, a stage movement speed of approximately 5 to approximately 250 mm/s, and a roller rotation speed of approximately 500 to approximately 2000 rpm.

With a conventional color filter substrate, an overcoat and an aligning film were formed, but an overcoat film composed of the overcoat film composition of the invention has good flatness, which is the function of an overcoat, and also has good liquid crystal molecular alignment, which is the function of the aligning film, so if an overcoat film of the overcoat film composition of the invention is formed, the process of manufacturing a color filter substrate will be simplified, and manufacturing cost can be reduced.

8. Liquid Crystal Display Element

The liquid crystal display element of the invention has a display element substrate or color filter substrate, having an overcoat film obtained using the overcoat film composition of the invention. For example, a liquid crystal display element having the color filter substrate of the invention is constituted such that a second transparent electrode (such as a TFT substrate) having a pixel electrode and a common electrodes, disposed across from the color filter substrate, and liquid crystal material sandwiched in between the two substrates.

The color filter substrate of the invention can be used favorably for liquid crystal display elements of the in-plane switching type because it does not include an ITO electrode.

Manufacturing the liquid crystal display element of the invention involves going through a step of assembling the aligning color filter substrate of the invention and the aligning second transparent substrate mentioned above across from each other with a spacer in between, a step of charging a liquid crystal material into this space, and a step of applying a polarizing film.

The electrodes provided on the substrate are formed by depositing chromium or another such metal on a glass or other transparent substrate by sputtering or another such method, and then using a resist pattern of the desired shape as a mask to perform etching.

The liquid crystal display element of the invention can be manufactured by cleaning with a cleaning liquid before and/or after the aligning treatment. Examples of cleaning methods include brushing, jet spraying, steam cleaning, and ultrasonic cleaning. These methods may be performed singly or in combination(s). The cleaning liquid may be pure water, any of various alcohols such as methyl alcohol, ethyl alcohol, or isopropyl alcohol, an aromatic hydrocarbon such as benzene, toluene, or xylene, a halogen-based solvent such as methylene chloride, or a ketones such as acetone or methyl ethyl ketone, although this list is not meant to be comprehensive. Naturally, the cleaning liquid is one that has been refined and includes few impurities.

There are no particular restrictions on the liquid crystal composition used in the liquid crystal display element of the invention, but various kinds of liquid crystal composition with a positive dielectric constant anisotropy can be used, for example. Favorable examples of liquid crystal compositions are disclosed, for example, in Japanese Patents 3,086,228 and 2,635,435, Published Japanese translation of PCT application H5-501735, Japanese Laid-Open Patent Applications H8-157826, H8-231960, H9-241644 (EP885272-A1), H9-302346 (EP806466-A1), H8-199168 (EP722998-A1), H9-235552, H9-255956, H9-241643 (EP885271-A1), H10-204016 (EP844229-A1), H10-204436, H10-231482, 2000-087040, and 2001-48822, and elsewhere.

The liquid crystal composition used in the liquid crystal display element of the invention can also be various kinds of liquid crystal composition with a negative dielectric constant anisotropy can be used, for example. Favorable examples of liquid crystal compositions are disclosed, for example, in Japanese Laid-Open Patent Applications S57-114532, H2-4725, H4-224885, H8-40953, H8-104869, H10-168076, H10-168453, H10-236989, H10-236990, H10-236992, H10-236993H10-236994, H10-237000, H10-237004, H10-237024, H10-237035, H10-237075, H10-237448 (EP967261-A1), H10-287874, H10-287875, H10-291945, H11-029581, H11-080049, 2000-256307, 2001-019965, 2001-072626, and 2001-192657 and elsewhere.

One or more kinds of optically active compound may also be added to a liquid crystal composition whose dielectric constant anisotropy is positive or negative.

The objects, features, advantages and ideas of the invention will be apparent to those skilled in the art from the description provided in the specification, and the invention will be readily practicable by those skilled in the art on the basis of the description appearing herein. The Description of the Preferred Embodiments and the Examples which show preferred modes for practicing the invention are included for the purpose of illustration and explanation, and are not intended to limit the scope of the claims. It will be apparent to those skilled in the art that various modifications may be made in how the invention is practiced based on described aspects in the specification without departing from the spirit and scope of the invention disclosed herein. Thus, it is intended that the invention covers the modifications and variations of this invention that come within the scope of any claims and their equivalents.

EXAMPLES

The invention will now be described by giving working and comparative examples, but the invention is not limited to or by these examples.

The names of the diamines, tetracarboxylic dianhydrides, and solvents used in the Example and Comparative Examples are abbreviated as follows. These abbreviations will be used in the following descriptions:

| Diamines | |
|---|---|
| 4,4'-Diaminodiphenyl Ether | APE |
| 3,3'-Diaminodiphenylsulfone | DDS |
| Tetracarboxylic Dianhydrides: | |
| 1,2,3,4-Cyclobutanetetracarboxylic Dianhydride | CBDA |
| Pyromellitic Dianhydride | PMDA |
| 3,3',4,4'-Diphenyl Ether Tetracarboxylic Dianhydride | ODPA |

-continued

| Solvent Components: | |
|---|---|
| N-Methyl-2-Pyrrolidone | NMP |
| γ-Butyrolactone | GBL |
| Butyl Cellosolve | BC |

Synthesis Example 1

Synthesis of Polyester-Polyamic Acid 65.00 g of ODPA, 9.44 g of 1,4-butanediol, and 111.66 g of dehydrated and purified NMP were added to a 500 mL four-neck flask equipped with a thermometer, a stirrer, a raw material feed port, and a nitrogen gas inlet, and the contents were stirred for 1 hour at 130° C. under a dry nitrogen gas flow. This reaction solution was cooled to 40° C., and 26.01 g of DDS and 122.72 g of dehydrated and purified NMP were added, and the contents were stirred for 2 hours at 40° C. under a dry nitrogen gas flow. Finally, 167.42 g of dehydrated and purified NMP was added and stirred, which gave a 20% solution of a pale yellow, transparent polyester-polyamic acid. The viscosity of this solution was 311 mPa·s. GPC measurement revealed the weight average molecular weight to be 14,000.

Synthesis Example 2

Synthesis of Polyamic Acid 1.96 g of CBDA, 2.18 g of PMDA, 4.00 g of APE, and 77.32 g of dehydrated NMP were put in a 200 mL four-neck flask equipped with a thermometer, a stirrer, a raw material feed port, and a nitrogen gas inlet, and the contents were stirred for 30 hours at 25° C. under a dry nitrogen gas flow. 38.67 g of BC and 38.67 g of GBL were added to this reaction solution, the temperature of this reaction solution was raised to 50° C., and the system was stirred for 6 hours. Thereafter, it was cooled, which gave a polyamic acid solution with a solids concentration of 5 wt %. The viscosity of the reaction solution was 34.2 mPa·s (E-type viscometer, 25° C.). The polyamic acid thus obtained had a weight average molecular weight of 38,000.

Example 1

Preparation of Overcoat Film Composition

The following components were mixed and dissolved at room temperature under a dry nitrogen gas flow.

| | |
|---|---|
| Polyester-Polyamic Acid Solution of Synthesis Example 1 | 5.00 g |
| Polyamic Acid Solution of Synthesis Example 2 | 2.00 g |
| NMP | 1.00 g |
| GBL | 2.00 g |
| BC | 2.00 g |

The solution thus obtained was filtered through a 0.2 μm membrane filter made of a fluororesin, which gave an overcoat film composition.

Example 2

Preparation of Overcoat Film

The overcoat film composition obtained in Example 1 was applied by spin coating over a glass substrate equipped with an electrode, thereby forming a coating film. The coating was performed for 10 seconds at 800 rpm. The coating film was pre-baked for approximately 5 minutes at 80° C., after which it was heat treated for 30 minutes at 210° C. to form an overcoat film with a thickness of 1.22 μm. The transmittance of this overcoat film at 400 nm was 97.7%. The overcoat film thus obtained was subjected to a rubbing treatment using a rubbing treatment apparatus made by Iinuma Gauge Manufacturing, in which the bristles of the rubbing cloth (rayon, with a bristle length of 1.8 mm) were pushed in to a depth of 0.40 mm, the stage movement speed was 60 mm/s, and the roller rotation speed was 1500 rpm. After the rubbing treatment, the surface of the liquid crystal-aligning film was observed with an optical microscope at magnifications of 100 and 400 times, which revealed no gouges or shavings resulting from rubbing.

The overcoat film thus obtained was ultrasonically cleaned for 5 minutes in ultra-pure water, after which it was dried for 30 minutes in a 120° C. oven. 4 μm gap materials were spread over the electrode-equipped glass substrate on which this overcoat film was formed, and was stuck on with the side on which the overcoat film was formed on the inside. This product was sealed with an epoxy curing agent, producing parallel cells with a gap of 4 μm. A liquid crystal material was injected into these cells, and the injection ports were sealed with a photosetting agent. Then, heat treatment was performed for 30 minutes at 110° C., after which the product was returned to room temperature. The liquid crystal composition used as the liquid crystal material contained the following components. The NI point of this composition was 100.0° C., and its birefringence was 0.093.

Liquid Crystal Composition

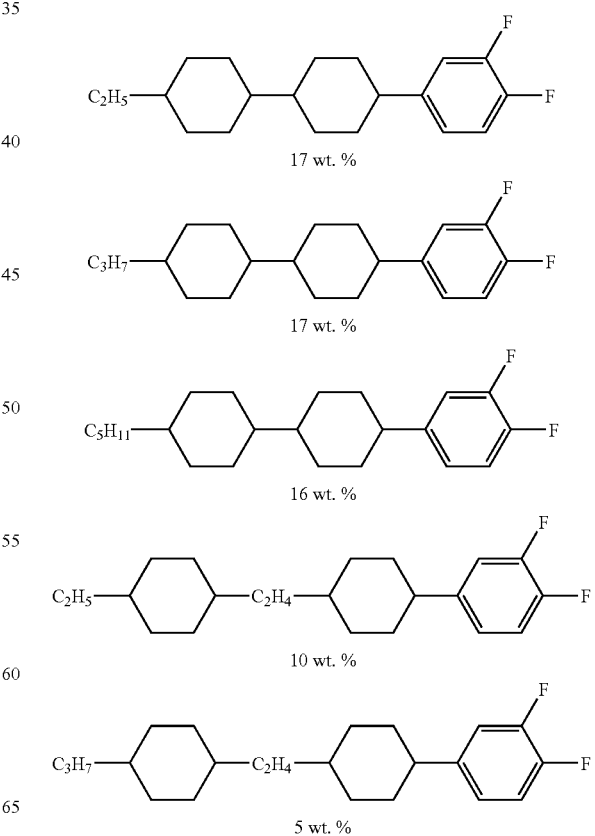

-continued

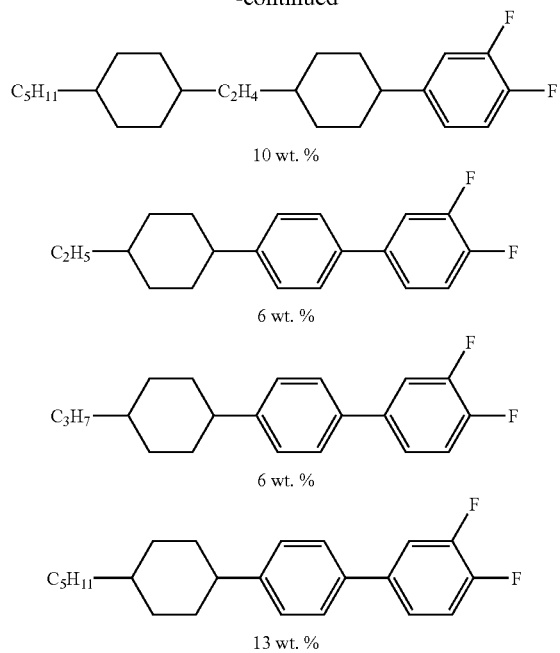

| | |
|---|---|
| Polyester-Polyamic Acid Solution of Synthesis Example 1 | 5.00 g |
| Polyamic Acid Solution of Synthesis Example 2 | 2.00 g |
| Celoxide 2021 P (cycloaliphatic epoxy resin) | 0.50 g |
| NMP | 1.00 g |
| GBL | 2.00 g |
| BC | 2.00 g |

An overcoat film with a thickness of 1.35 μm was formed under the same conditions as in Example 2, except that the spin coating was performed for 10 seconds at 1800 rpm. The transmittance of this overcoat film at 400 nm was 97.9%.

The overcoat film thus obtained was subjected to a rubbing treatment under the same conditions as in Example 2, and after the rubbing treatment the surface of the liquid crystal-aligning film was observed with an optical microscope at magnifications of 100 and 400 times, which revealed no gouges or shavings resulting from rubbing. Liquid crystal molecular alignment was checked by observation with a polarizing microscope after cell production, but no light leakage due to poor orientation was observed in the state of no voltage applying.

Checking liquid crystal molecular alignment: Liquid crystal molecular alignment was checked by observation with a polarizing microscope at room temperature. It was observed in the state of no voltage applying. When the cell was rotated on stage of the polarizing microscope, it was observed to alternate between bright and dark states. No light leakage due to poor aligning was observed in the dark state.

Example 3

The following components were mixed and dissolved at room temperature under a dry nitrogen gas flow, after which the resulting solution was filtered through a 0.2 μm membrane filter made of a fluororesin, which gave an overcoat film composition.

Example 4

Using the overcoat film composition prepared in Example 3, an overcoat film was formed on a glass substrate under the same conditions as in Example 3, after which this overcoat film was subjected to a rubbing treatment. This overcoat film was spin coated with a polymerizable liquid crystal composition (PLC-1). This coating was performed for 10 seconds at 800 rpm. After being coated with the PLC-1, the substrate was heated on a hot plate for 3 minutes at 80° C., and then cooled on a room temperature aluminum pad. It was then irradiated with ultraviolet rays of 365 nm at 300 mJ/cm$^2$ under a nitrogen atmosphere, and baked for 30 minutes in a 220° C. oven, which gave an optical film composed of the polymerizable liquid crystal composition (PLC-1). In this way, a display element substrate having the overcoat film and the optical film formed over the overcoat film was obtained. The liquid crystal molecular alignment was checked with a polarized microscope and found to be good.

Polymerizable Liquid Crystal Composition (PLC-1)

| | |
|---|---|
| LC11 | 19.5 wt % |
| LC12 | 10.5 wt % |
| Cyclopentanone | 69.0 wt % |
| Irgacure 651™ | 1.0 wt % |

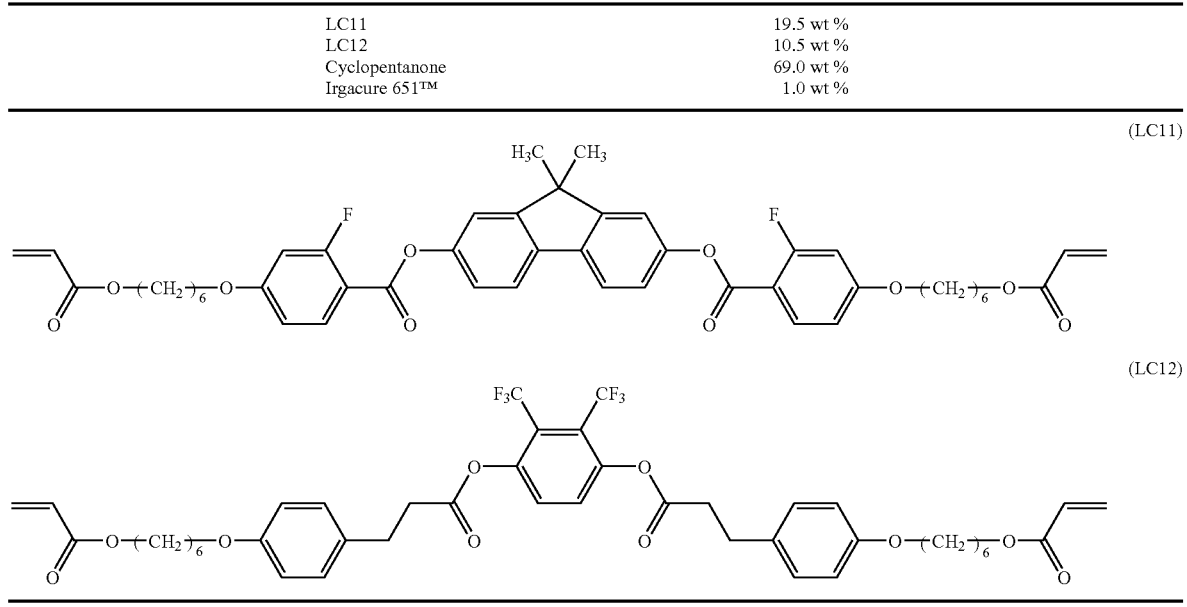

The compounds LC11 and LC12 were synthesized by a method disclosed in Japanese Laid-Open Patent Application 2006-307150. Irgacure 651™ is a photopolymerization initiator made by Ciba Specialty Chemicals.

Comparative Example 1

6 g of 2,2'-azobis(isobutyronitrile), 200 g of propylene glycol monomethyl ether acetate (hereinafter referred to as PGMEA), 20 g of styrene, 65 g of glycidyl methacrylate, and 15 g of N-phenylmaleimide were added to a 500 mL four-neck flask equipped with a thermometer, a stirrer, a raw material feed port, and a nitrogen gas inlet, and the contents were reacted for 4 hours at 95° C. under a dry nitrogen gas flow, which gave a copolymer solution.

The following components were added to this copolymer solution and mixed and dissolved at room temperature under a dry nitrogen gas flow, after which the solution thus obtained was filtered through a 0.2 μm membrane filter made of a fluororesin, which gave an overcoat film composition.

| | |
|---|---|
| Propylene Glycol Monomethyl Ether Acetate | 100 g |
| Diethylene Glycol Methylethyl Ether | 60 g |
| Epikote 1032H60 ™ (Alicyclic Epoxy Resin made by Yuka Shell Epoxy) | 20 g |
| Trimellitic Anhydride | 20 g |
| γ-Glycidoxypropyldiethoxysilane | 5 g |
| Megafac 172 ™ (Surfactant made by Dainippon Ink & Chemicals) | 0.02 g |

An overcoat film with a thickness of 1.41 μm was formed under the same conditions as in Example 1, except that the spin coating was performed for 10 seconds at 1250 rpm. The transmittance of this overcoat film at 400 nm was 98.7%.

The overcoat film thus obtained was subjected to a rubbing treatment under the same conditions as in Example 2, and after the rubbing treatment the surface of the liquid crystal-aligning film was observed with an optical microscope at magnifications of 100 and 400 times, which revealed no gouges or shavings resulting from rubbing. Liquid crystal molecular alignment was checked by observation with a polarizing microscope after cell production, but no light leakage due to poor orientation was seen in the state of no voltage applying.

INDUSTRIAL APPLICABILITY

Examples of how the invention can be put to use include a liquid crystal display element, and a color filter substrate that is part of a liquid crystal display element.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. An overcoat film composition, comprising approximately 5 to approximately 30 wt % a polyester-polyamic acid (A1); wherein said polyester-polyamic acid (A1) is obtained by reacting 1,4-butanediol, 3,3'-diaminodiphenylsulfone, and 3,3',4,4'-diphenyl ether tetracarboxylic dianhydride,
approximately 0.2 to approximately 10 wt % a polyamic acid (B); wherein said polyamic acid (B) is obtained by reacting 4,4'-diaminodiphenyl ether, pyromellitic dianhydride, and 1,2,3,4-cyclobutanetetracarboxylic dianhydride;
approximately 5 to approximately 30 wt % a polyester-polyimide (A2); wherein (A2) has structural units expressed by Formulas (3) and (2):

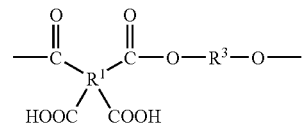

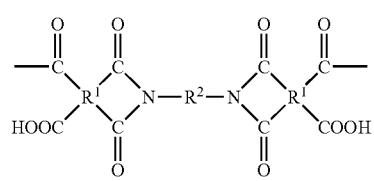

wherein $R^1$, $R^2$, and $R^3$ are each independently a $C_2$ to $C_{100}$ organic group; and one or more epoxy resins (C) selected from the group consisting of compounds expressed by Formulas (220) to (223):

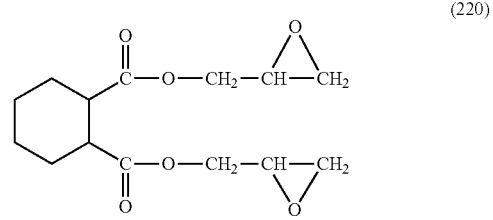

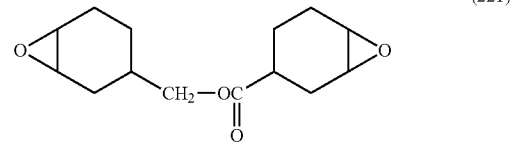

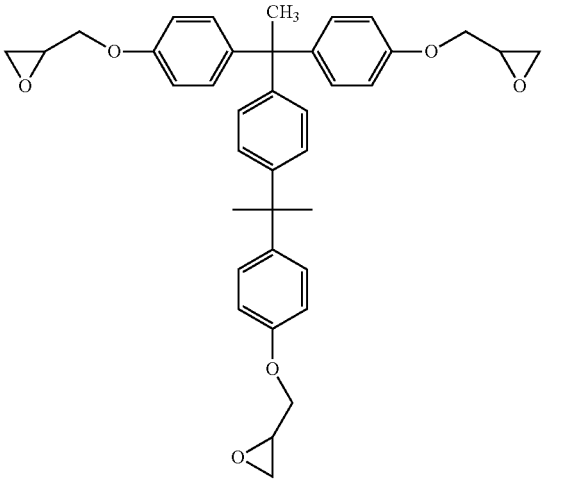

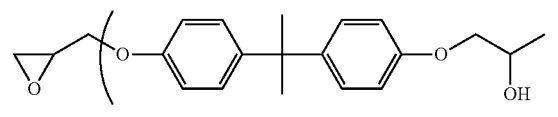

-continued

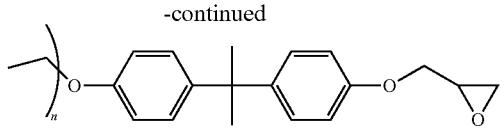

wherein n is an integer from approximately 0 to approximately 10.

2. An overcoat film, obtained from the overcoat film composition according to claim 1.

3. A display element substrate, including the overcoat film according to claim 2 and an optical film obtained from a polymerizable liquid crystal composition formed on the overcoat film.

4. A liquid crystal display element, comprising the display element substrate according to claim 3.

5. A color filter substrate, on which the overcoat film according to claim 2 is formed.

6. A liquid crystal display element, comprising the color filter substrate according to claim 5.

* * * * *